(12) United States Patent
Farbood et al.

(10) Patent No.: US 6,511,686 B1
(45) Date of Patent: Jan. 28, 2003

(54) MIXTURES OF OPTICAL ISOMERS OF STYRALYL ALCOHOL OR STYRALYL ACETATE, PROCESSES FOR PREPARING SAME AND ORGANOLEPTIC USES THEREOF

(75) Inventors: Mohamad I. Farbood, State College, PA (US); Robert W. Blocker, Brick, NJ (US); Joseph Arvizzigno, Scotch Plains, NJ (US); Ranya Muralidhara, Fair Haven, NJ (US)

(73) Assignee: International Flavors & Fragrances Inc., New York, NY (US)

( * ) Notice: Subject to any disclaimer, the term of this patent is extended or adjusted under 35 U.S.C. 154(b) by 0 days.

(21) Appl. No.: 09/573,532

(22) Filed: May 19, 2000

(51) Int. Cl.$^7$ ................................................. A23L 1/22
(52) U.S. Cl. ........................ 426/7; 426/534; 426/536; 426/538
(58) Field of Search .................. 426/534, 3, 590, 426/536, 538, 7

(56) References Cited

U.S. PATENT DOCUMENTS 4,404,184 A * 9/1983 Pittet et al. ..................... 426/3

OTHER PUBLICATIONS

Simon, et al, title: "Chiral Compounds Synthesized by Biocatalytic Reductions," *Angew. Chem. Int. Ed. Engl.* 24 (1985), pp. 539–553.

Adlercreutz, title: "Asymmetric Reduction of Ketones with Enzymes from Acetic Acid Bacteria," *Biotechnology Letters*, vol. 13, No. 4, pp. 229–234 (1991).

Nakamura, et al, title: "Asymmetric Synthesis of (S)–Arylalkanols by Microbial Reduction," *Tetrahedron: Asymmetry*, vol. 7, No. 10, pp. 3021–3024 (1996).

Vicenzi, et al, title: "Large–scale stereoselective enzymatic ketone reduction with in situ product removal via polymeric adsorbent resins," *Enzyme and Microbial Technology*, vol. 20, pp. 494–499 (1997).

Sorrilha, et al, title: "Reduction of Phenylketones by Immobilized Baker's Yeast," *Bioorganic & Medicinal Chemistry Letters*, vol. 2, No. 2, pp. 191–196 (1992).

* cited by examiner

Primary Examiner—Leslie Wong
(74) Attorney, Agent, or Firm—Arthur L. Liberman

(57) ABSTRACT

Described are novel mixtures of optical isomers of (i) styralyl alcohol (α-phenylethyl alcohol) or (ii) styralyl acetate (α-phenylethyl acetate), fermentation processes for preparing same and organoleptic uses for same as aroma or food flavor ingredients.

2 Claims, 16 Drawing Sheets

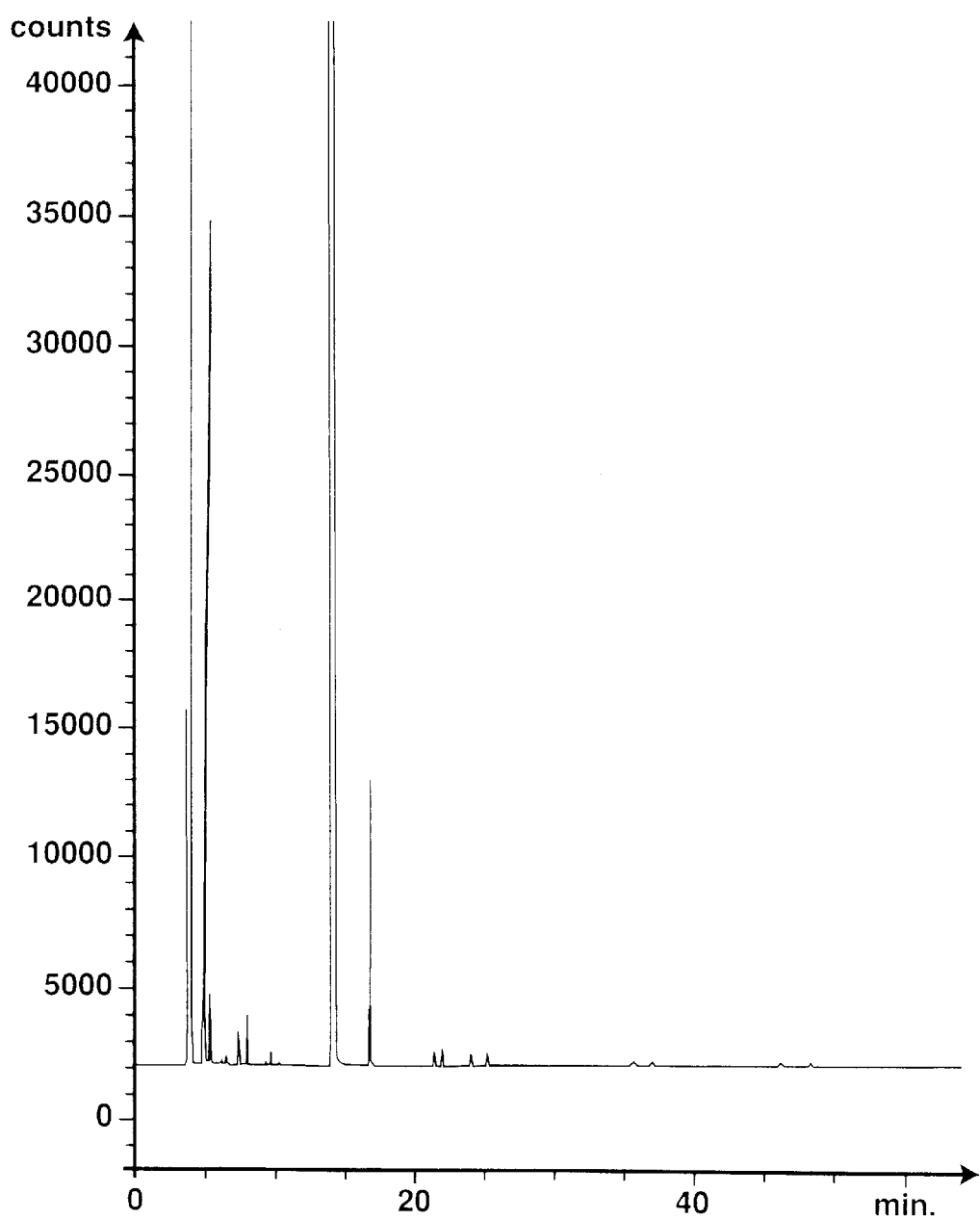
FIG. 1-A

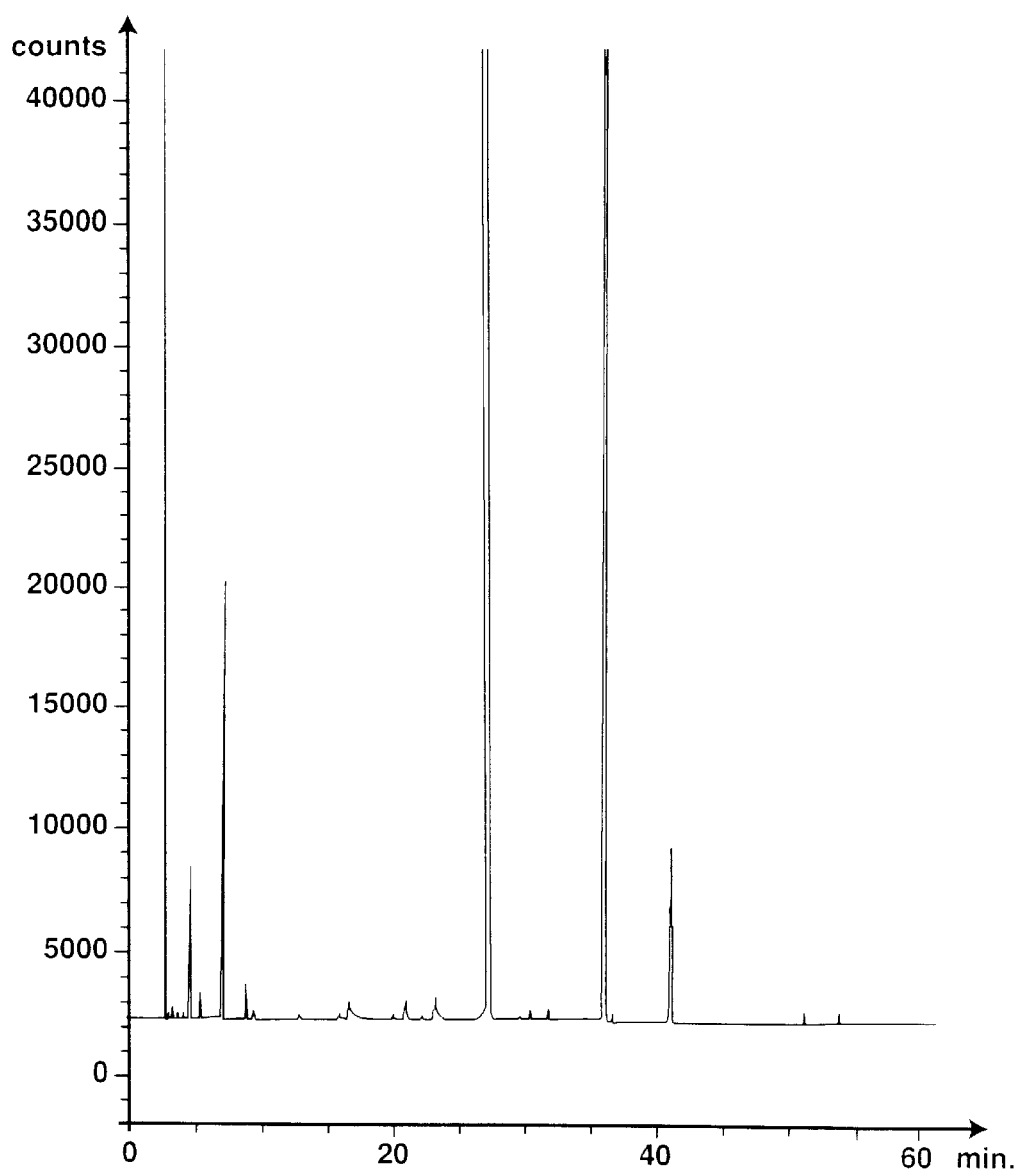
FIG. 1-B

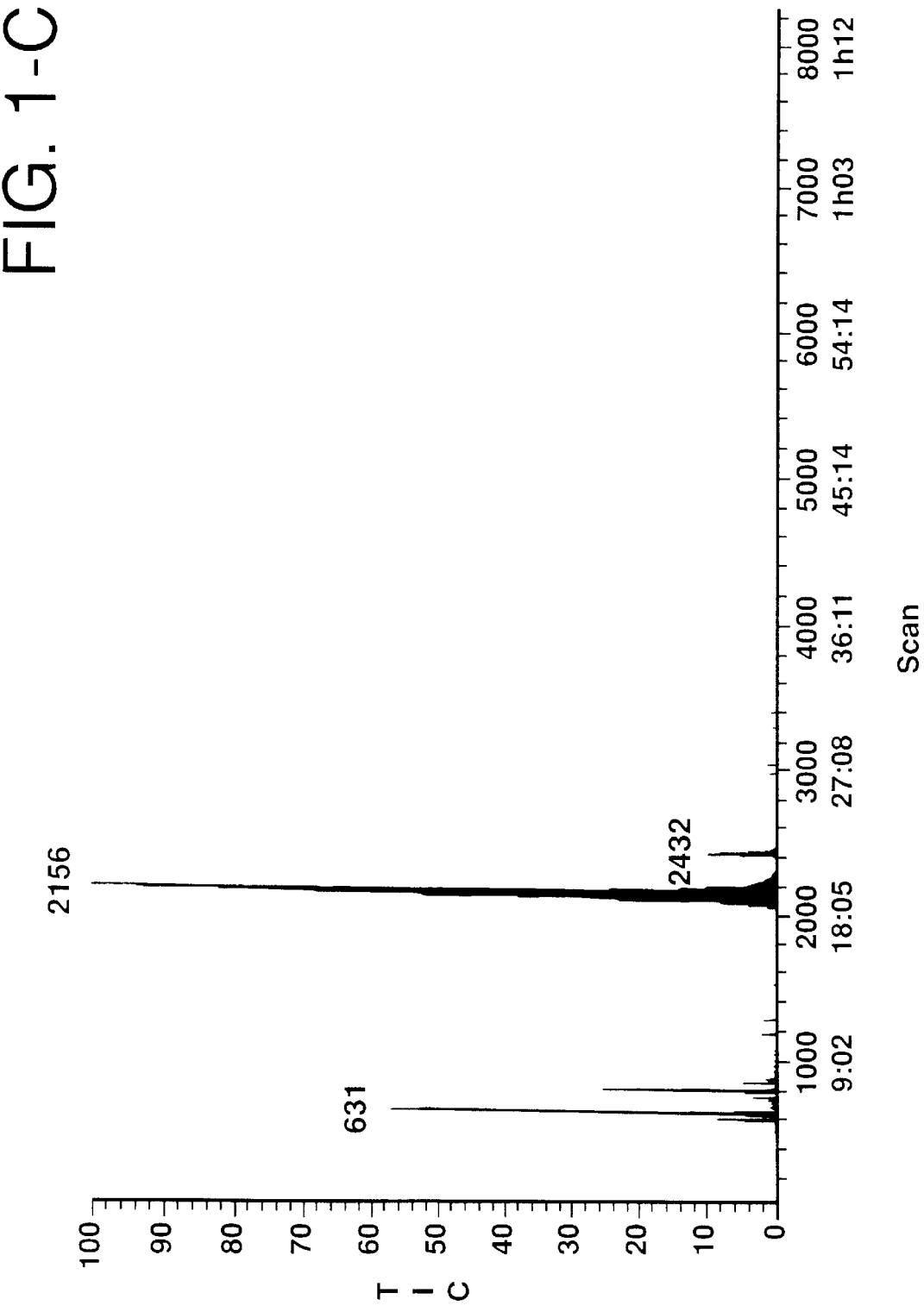
FIG. 1-C

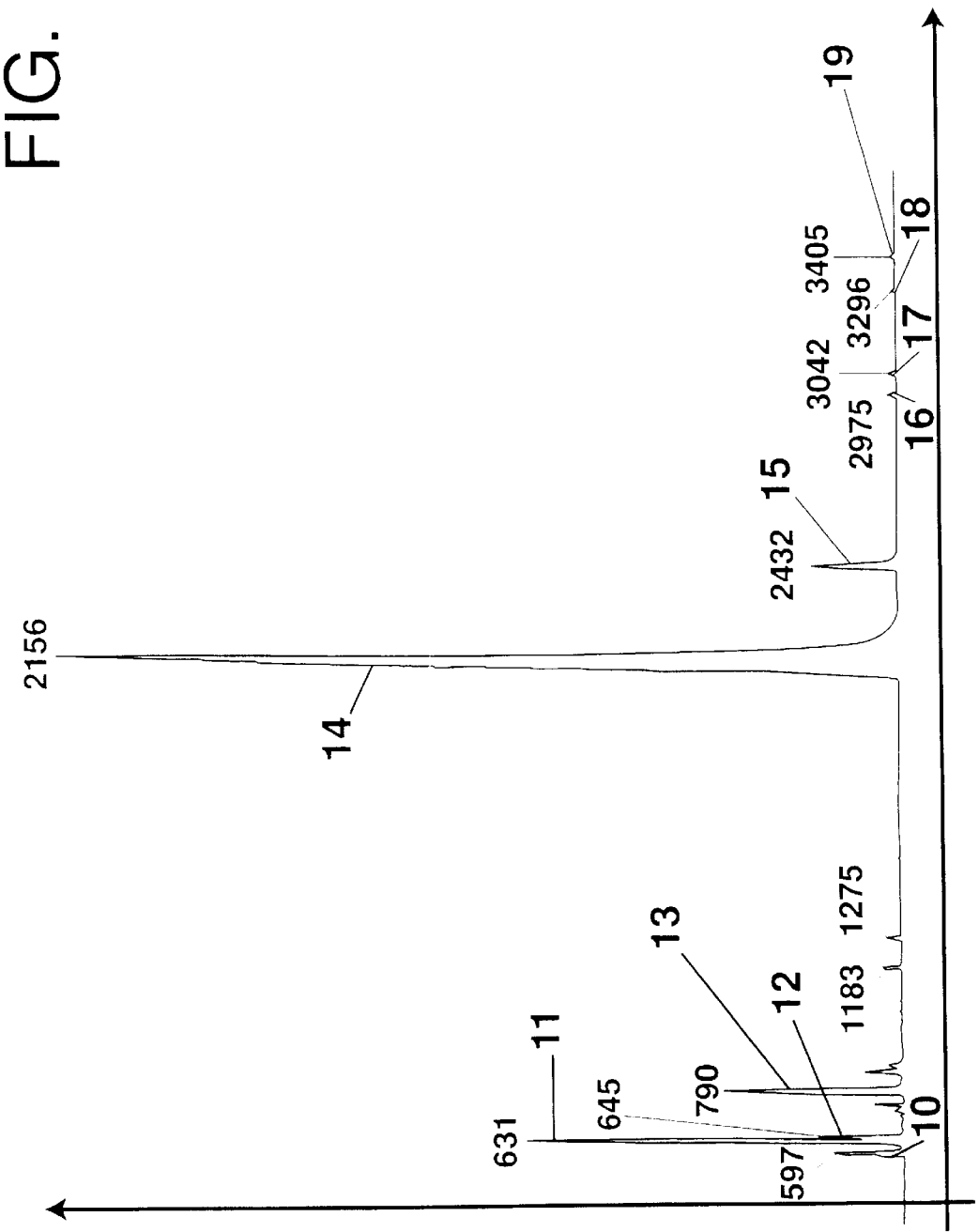
FIG. 1-D

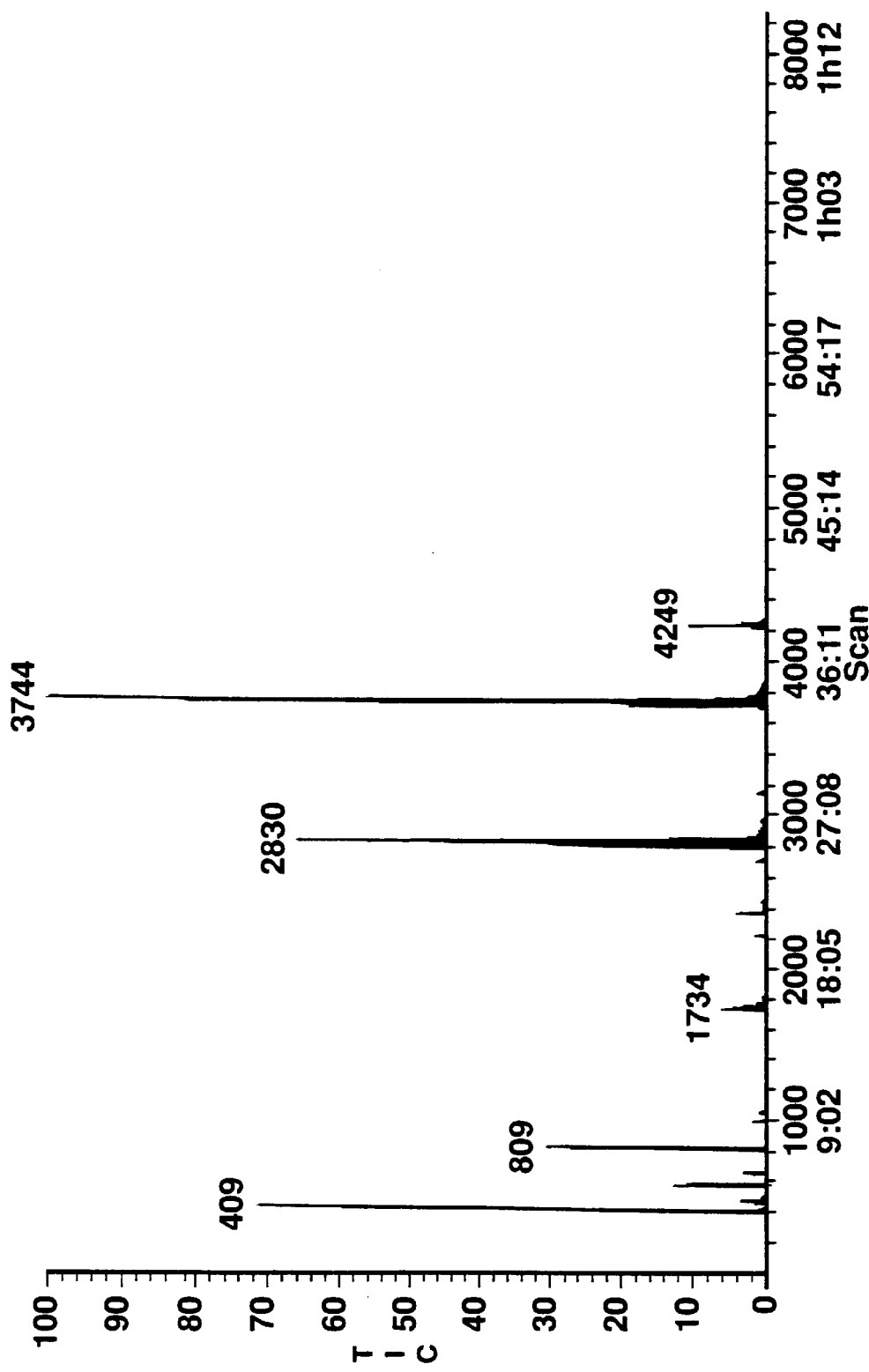
FIG. 1-E

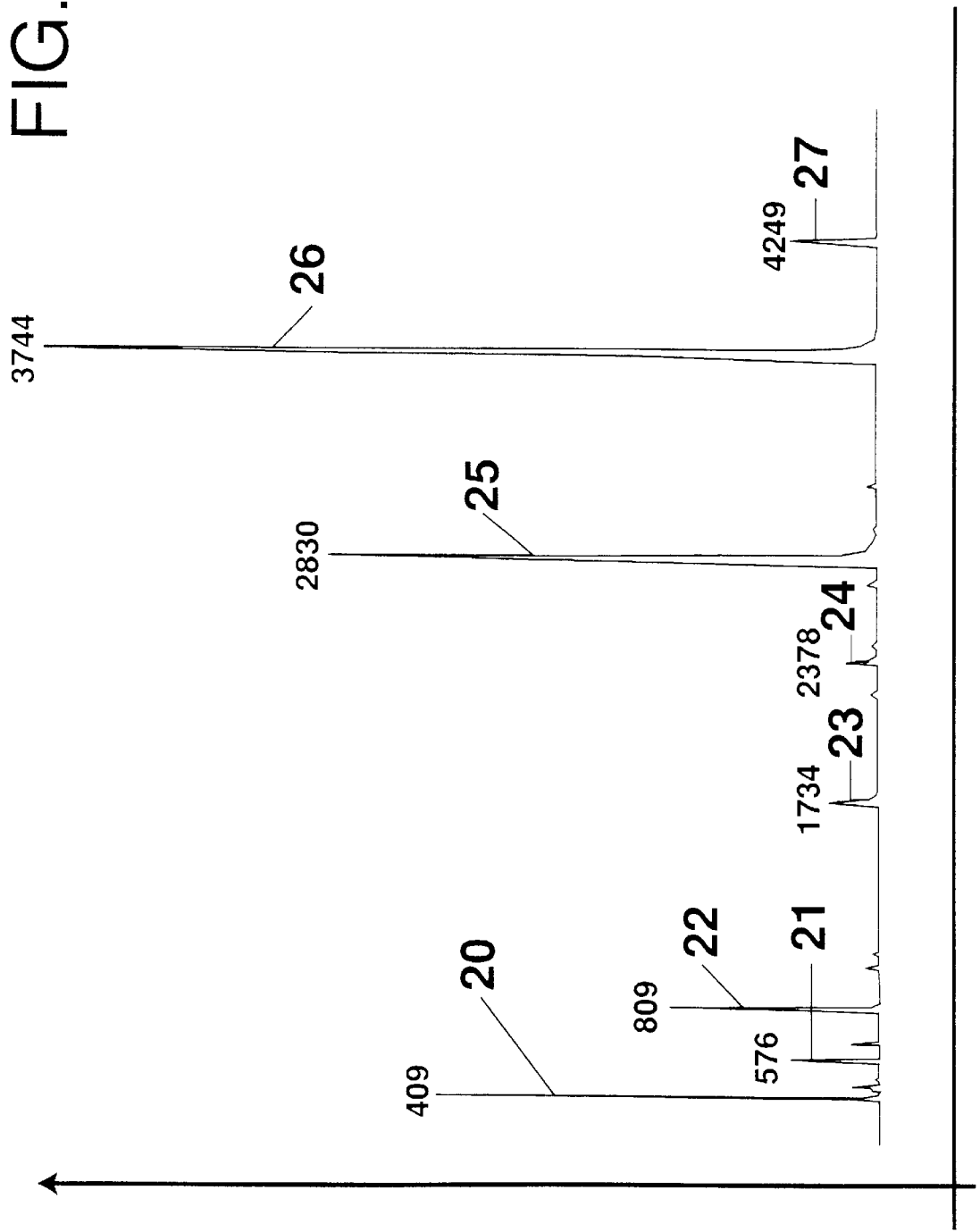
FIG. 1-F

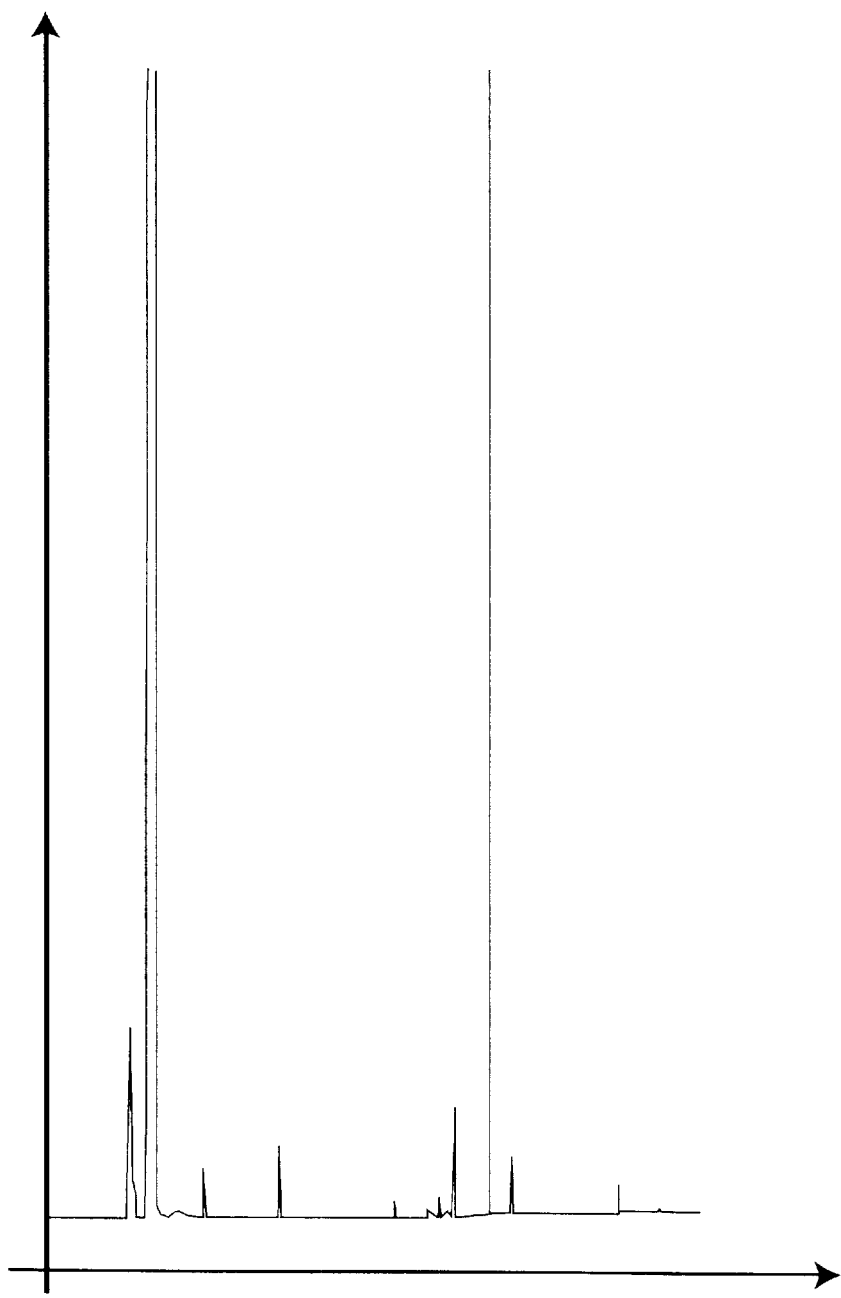
FIG. 2-A

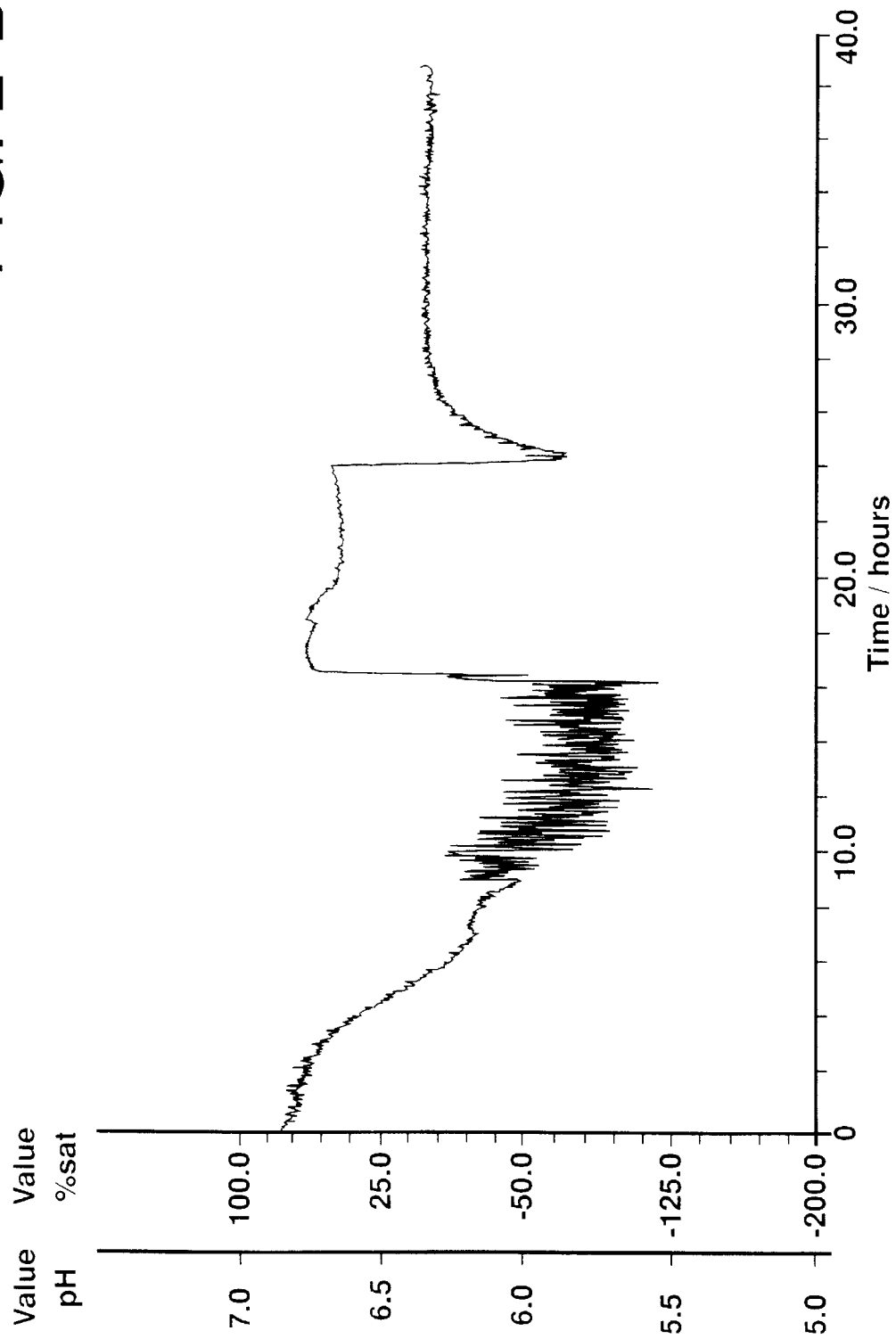
FIG. 2-B

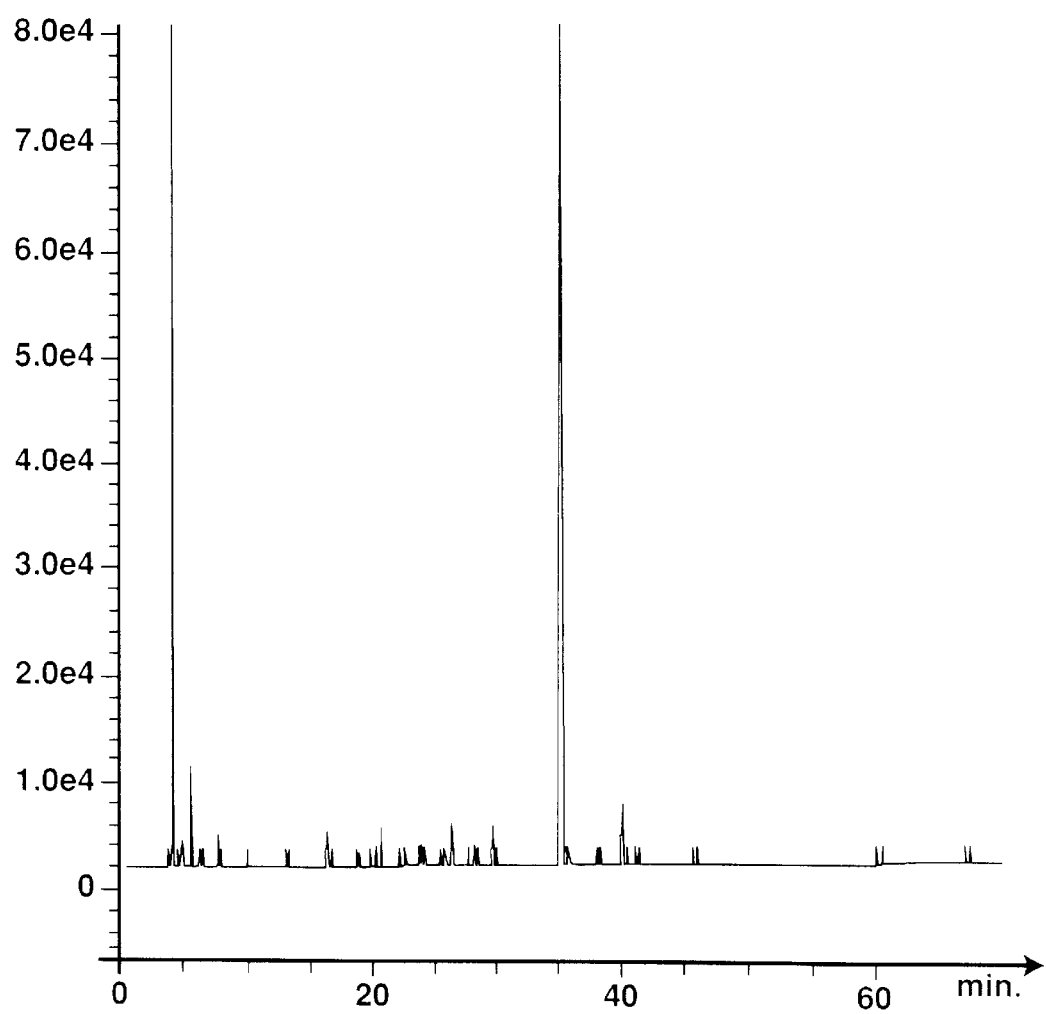
FIG. 2-C

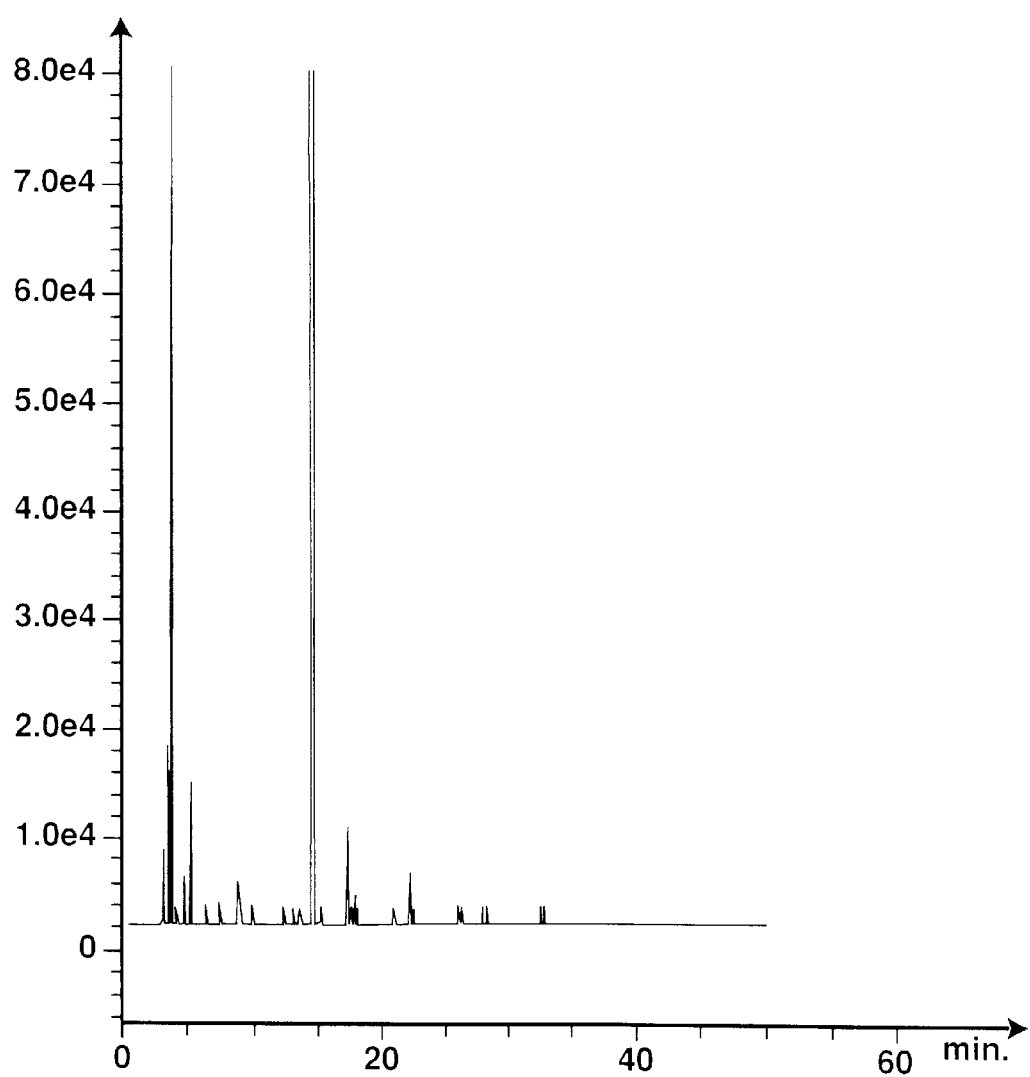
FIG. 2-D

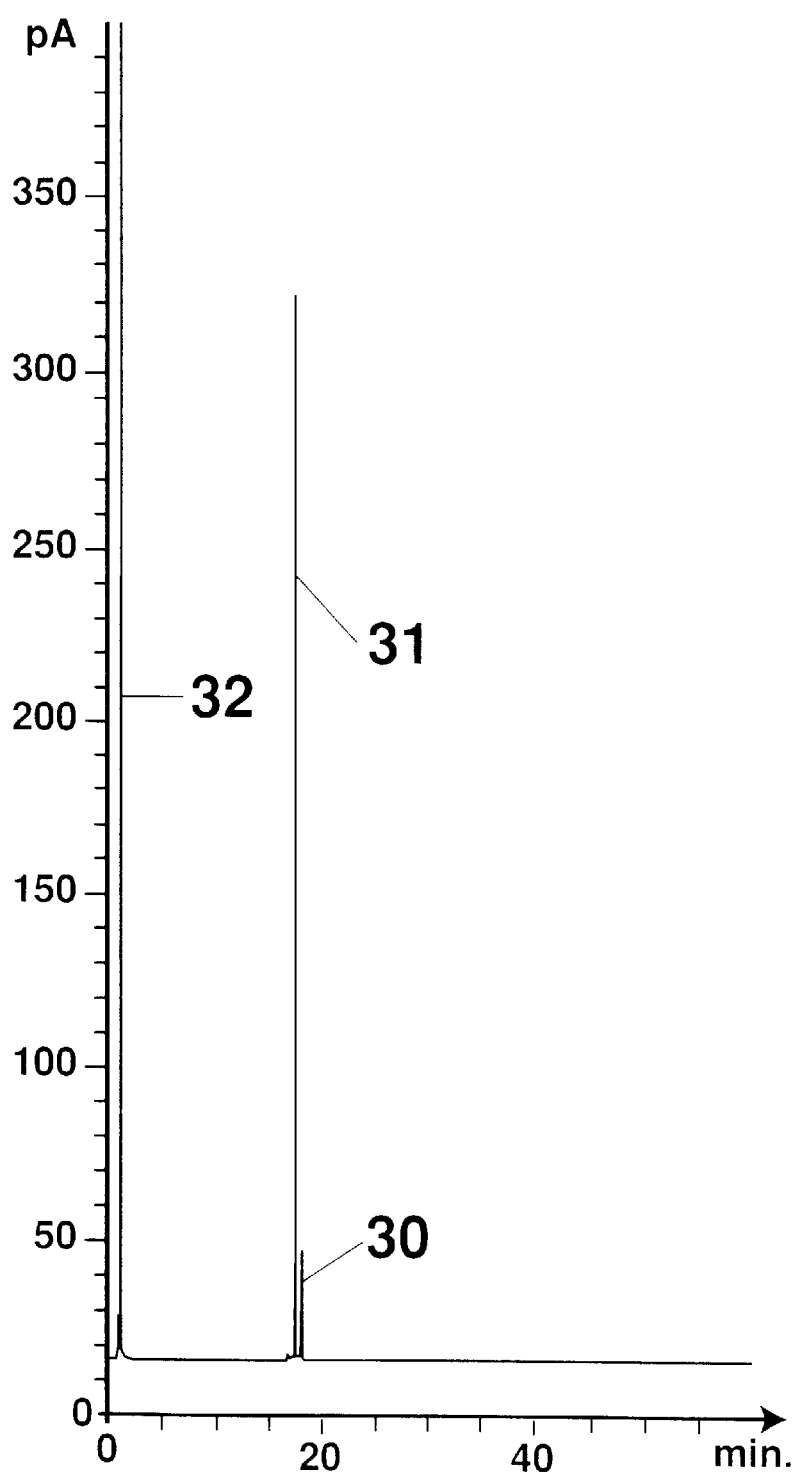
FIG. 3-A

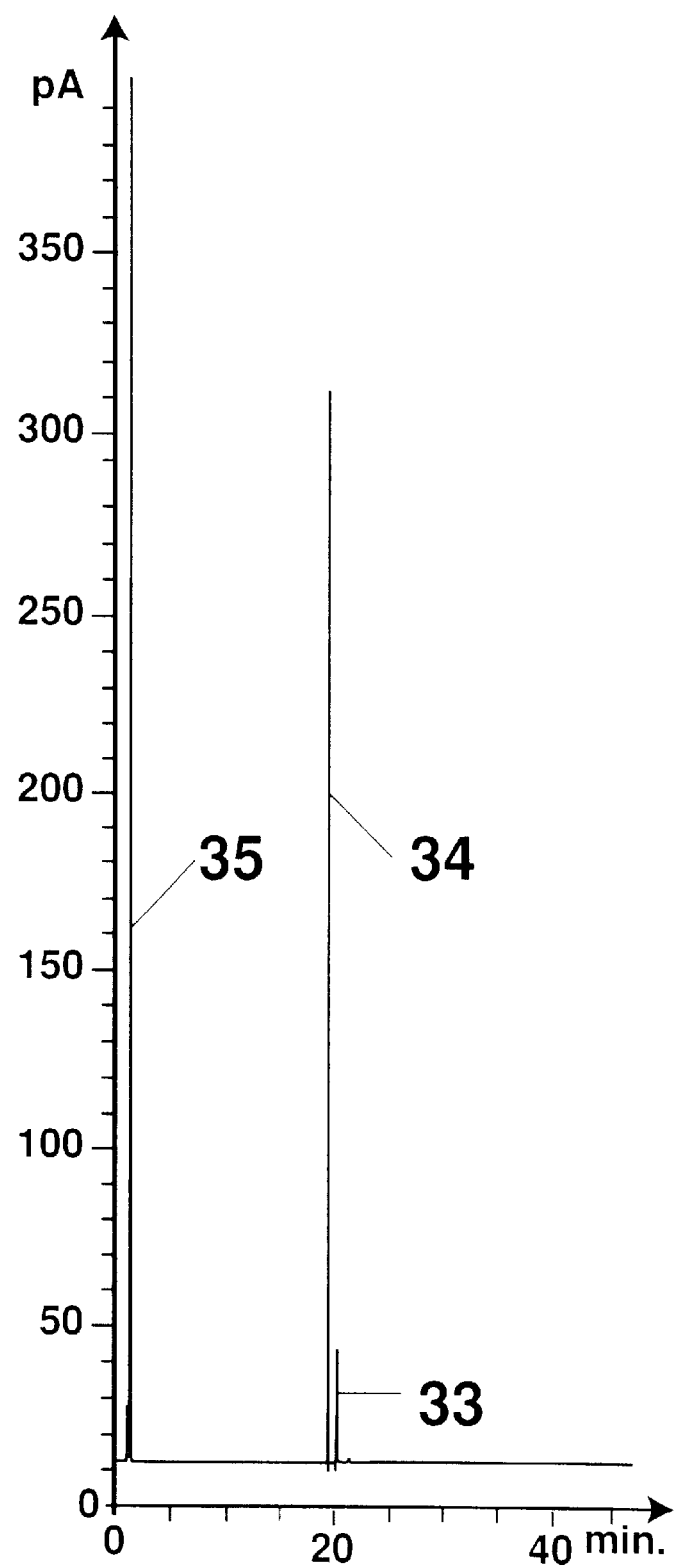
FIG. 3-B

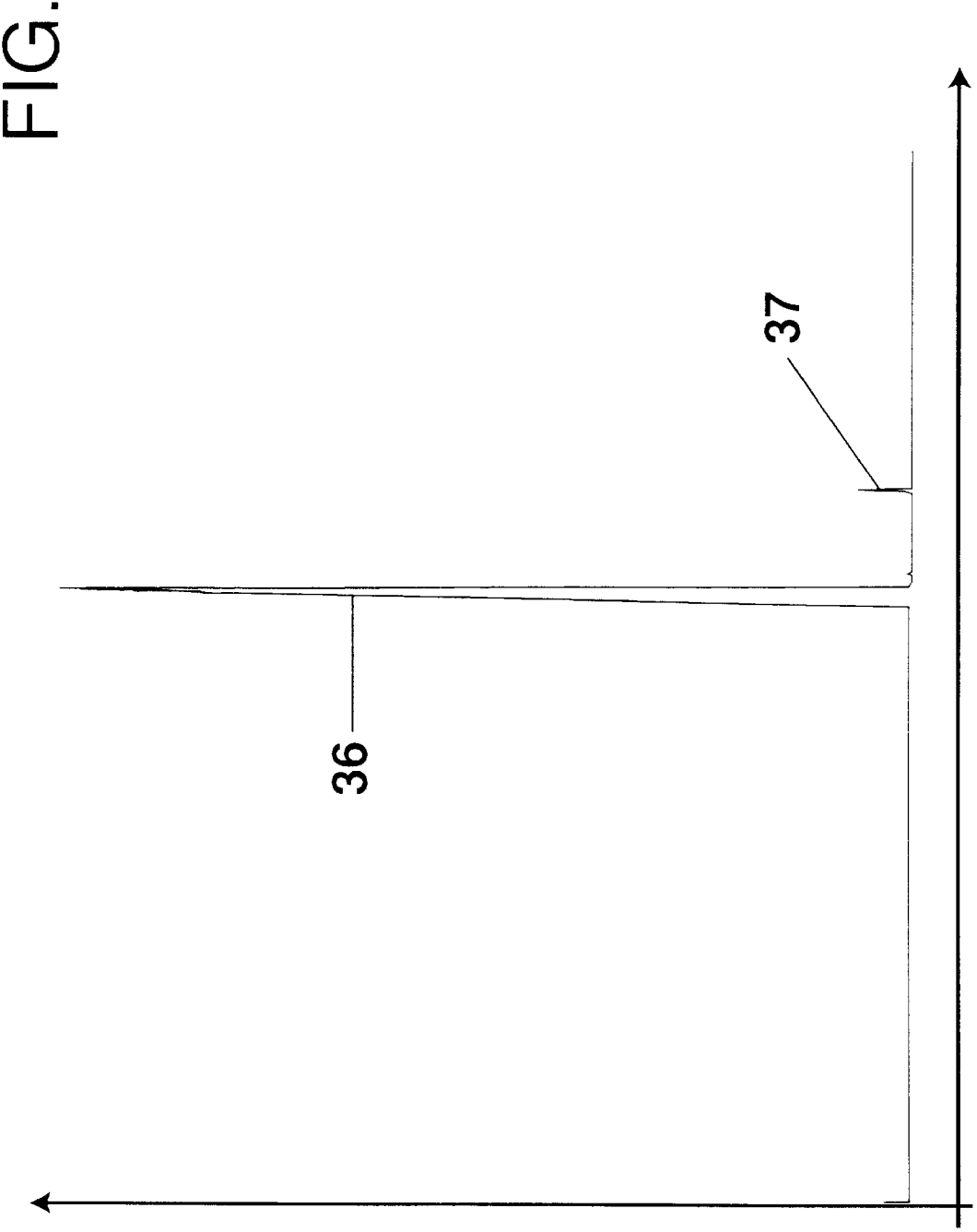

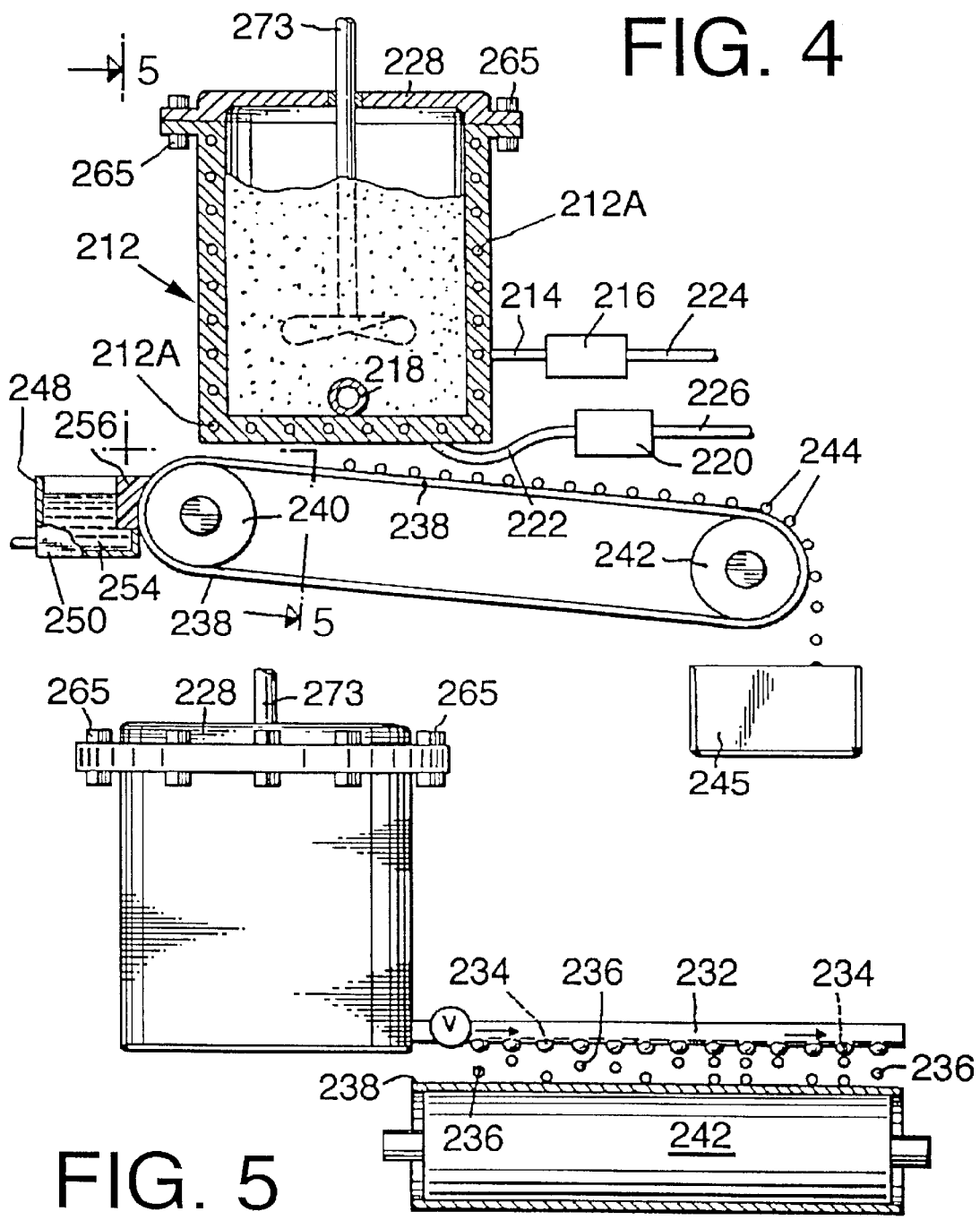

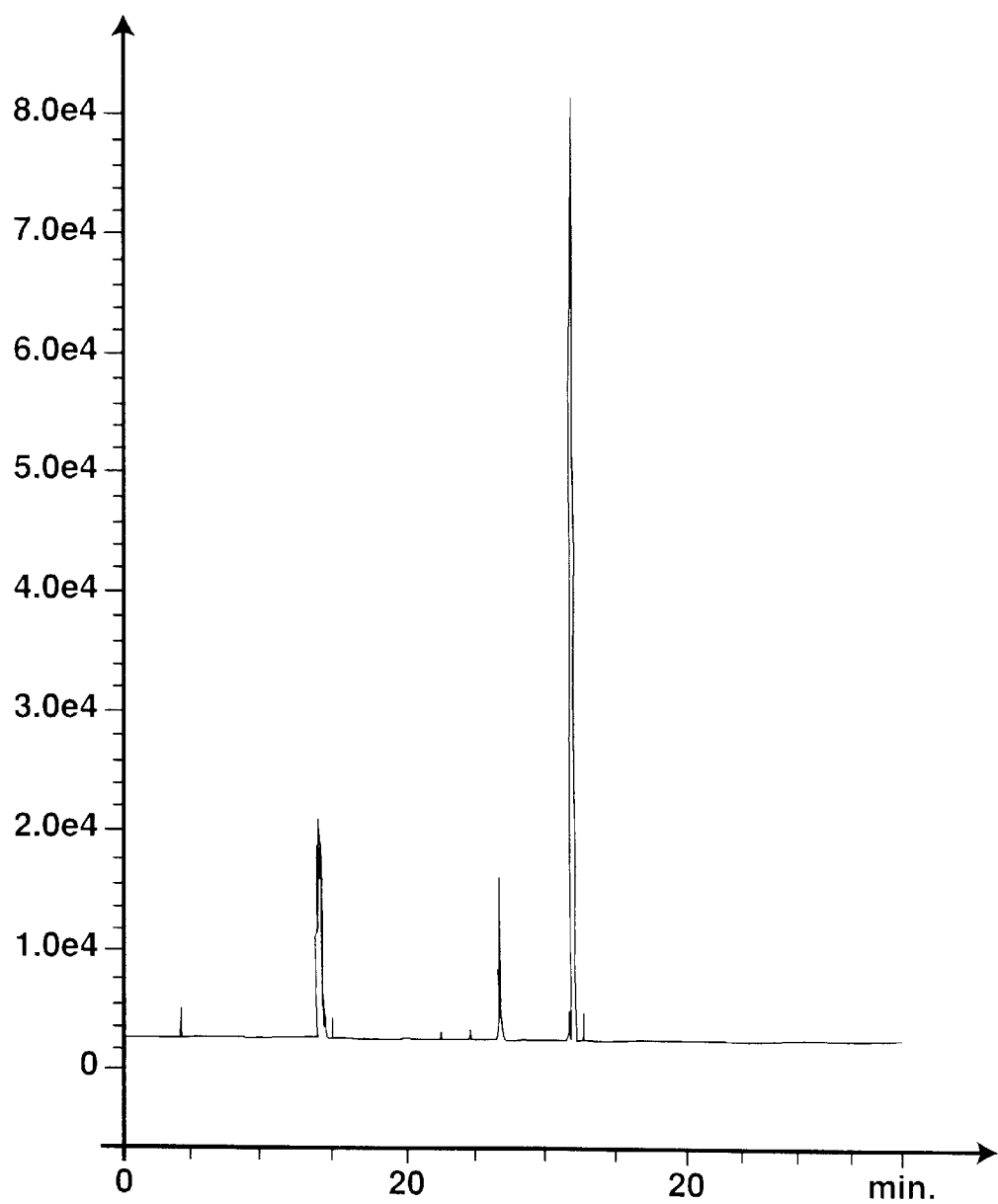
FIG. 6-A

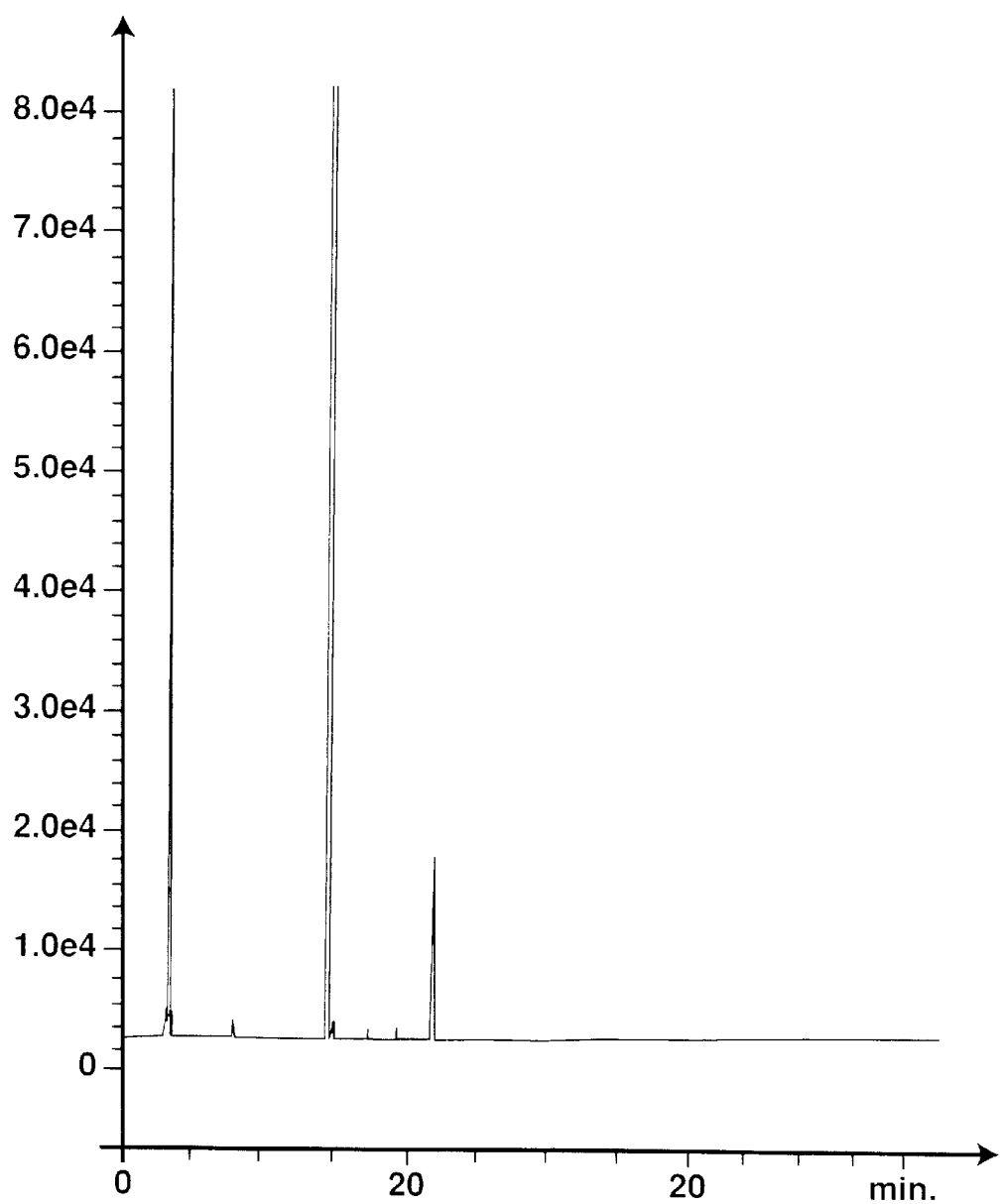
FIG. 6-B

MIXTURES OF OPTICAL ISOMERS OF STYRALYL ALCOHOL OR STYRALYL ACETATE, PROCESSES FOR PREPARING SAME AND ORGANOLEPTIC USES THEREOF

BACKGROUND OF THE INVENTION

The present invention relates to novel styralyl alcohol isomer mixtures and novel sytralyl acetate isomer mixtures, fermentation processes for preparing same and organoleptic uses for same as aroma or food flavor ingredients.

In today's market, it is frequently desirable to identify flavor components of food items as being "natural flavors." It is generally recognized in the industry that a flavor compound having been prepared by microbial processes can be designated as a natural product and therefore have an important place in the commercialization of products containing them. As a result, the industry has devoted considerable time and effort to develop methods for the production of flavoring components and, in particular, for the production of certain alcohol and acetate derivatives which can properly be called "natural."

Furthermore, in today's market, a trend is developing whereby it is now determined to be desirable to identify fragrance ingredients of fragrance compositions as being "natural fragrance ingredients." It is generally recognized in the industry that a fragrance compound having been prepared by microbial processes can be designated as a natural product and therefore have an important place in the commercialization of perfumes and perfumed articles containing them. As a result, the industry has devoted considerable time and effort to develop methods for the production of fragrance components and in particular for the production of alcohols and esters which can be called "natural fragrance ingredients."

It is also well known in the flavor and fragrance industry that particular stereoisomers of specific ingredients are, in many instances, more advantageous than their corresponding opposite stereoisomers. Accordingly, a significant amount of research has been carried out covering the formation of such stereoisomers using, for example, microbial reduction.

Thus, Simon, et al, *Angew. Chem. Int. Ed Engl.* 24 (1985), pages 539–553 (title: "Chiral Compounds Synthesized by Biocatalytic Reductions") discloses at section 3.2 on page 545 the hydrogenation of ketones to form chiral secondary alcohols using Clostridia such as *Clostridium kluyveri* and specifically sets forth the production of α-phenylethyl alcohol stereoisomers having the structure:

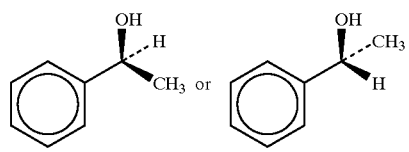

with an enantiomeric excess of 94%.

Adlercreutz, *Biotechnology Letters*, Volume 13, No. 4 at pages 229–234 (1991) (title: "ASYMMETRIC REDUCTION OF KETONES WITH ENZYMES FROM ACETIC ACID BACTERIA") shows production of α-phenylethyl alcohol at page 233 using *G. oxydans* (an enantiomeric excess of 99%); *A. aceti* (an enantiomeric excess of 92%); *G. oxydans* (an enantiomeric excess of 75%); *A. aceti* (an enantiomeric excess of 86%); *A. pasteurianus* (an enantiomeric excess of 94%); and *A. peroxydans* (an enantiomeric excess of 66%).

Nakamura, et al, *Tetrahedron: Asymmetry*, Volume 7, No. 10 at pages 3021–3024, 1996, published by Elsevier Science Ltd. (title: "Asymmetric Synthesis of (S)-Arylatkanols by Microbial Reduction") sets forth the production of the isomers having the structures:

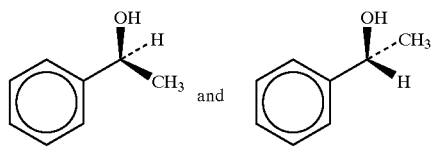

using acetophenone as a starting material in accordance with the reaction:

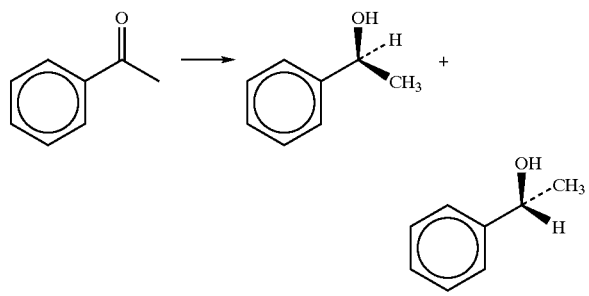

using *Geotrichum candidum* IFO 4597, but only shows the production of a stereoisomer mixture having 28% enantiomeric excess.

Vicenzi, et al, *Enzyme and Microbial Technology*, 20: pages 494–499, 1997, published by Elsevier Science Inc. (title: "Large-scale stereoselective enzymatic ketone reduction with in situ product removal via polymeric adsorbent resins") discloses the stereoselective enzymatic reduction of 3,4-methylene-dioxyphenyl acetone to the corresponding S-3,4-methylene-dioxyphenyl isopropanol utilizing *Zygosaccharomyces rouxii*.

Sorrilha, et al, *Organic & Medicinal Chemistry Letters*, Volume 2, No. 2 at pages 191–196, 1992, published by Pergamon Press plc (tide: "REDUCTION OF PHENYLKETONES BY IMMOBILIZED BAKER'S YEAST") discloses a process wherein baker's yeast immobilized on chrysotile and montmorillonite causes stereoselective reduction of 1-phenyl-1,2-propanedione to the corresponding (1R,2S)-diol.

Nothing in the prior art, however, discloses the production of the stereoisomeric mixture of the compounds having the structures:

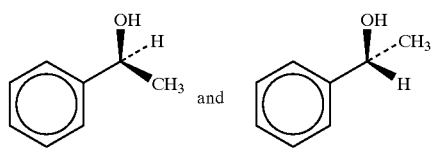

having an $\alpha_D^{20} = -38.6°$ with an enantiomeric excess percent of 87.5 ([ee%=87.5]) and furthermore, nothing in the prior art discloses the production of the stereoisomeric mixture of esters having the structures:

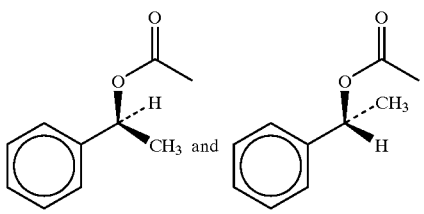

having ($\alpha_D^{20}=+73.06°$) with an enantiomeric excess percent of 79.2, [ee%=79.2] or $\alpha_D^{20}=-102.7°$ with an enantiomeric excess percent of 89.15, [ee%=89.15], which materials have been found by us to have unexpected, unobvious and advantageous properties insofar as their organoleptic (flavor and fragrance) utilities are concerned.

SUMMARY OF THE INVENTION

The above and other objects and features of the invention are obtained in accordance with the present invention by carrying out a process using (i) reductive reaction techniques to produce and recover certain naturally occurring alcohols and (ii) esterification reaction techniques to produce and recover certain naturally occurring esters, found to be useful for their organoleptic properties in augmenting or enhancing the aroma or taste of consumable materials such as foodstuffs, chewing gums, toothpastes, oral care products, chewing tobaccos, smoking tobaccos, perfume compositions, colognes and perfumed articles such as solid or liquid detergents, perfumed polymers, fabric softener compositions, fabric softener articles, cosmetic powders, hair preparations and the like.

The reductive reaction products are styralyl alcohol stereoisomer mixtures containing compounds having the structures:

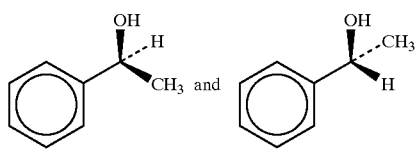

produced according to a fermentation reaction whereby acetophenone is reduced according to the reaction:

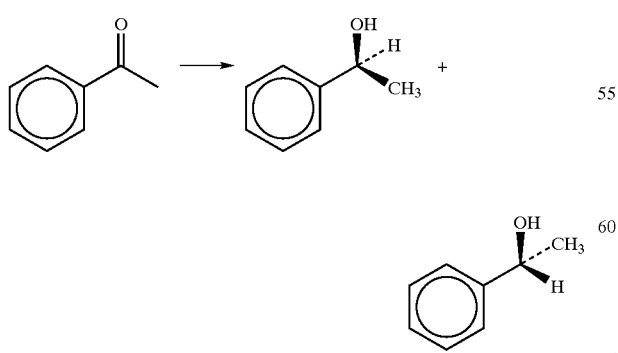

using a culture of *Kluyveromyces polysporus* ATCC 22028.

The resulting products may be used as is for their organoleptic properties or may be further reacted by means of esterification with acetic acid according to the reaction:

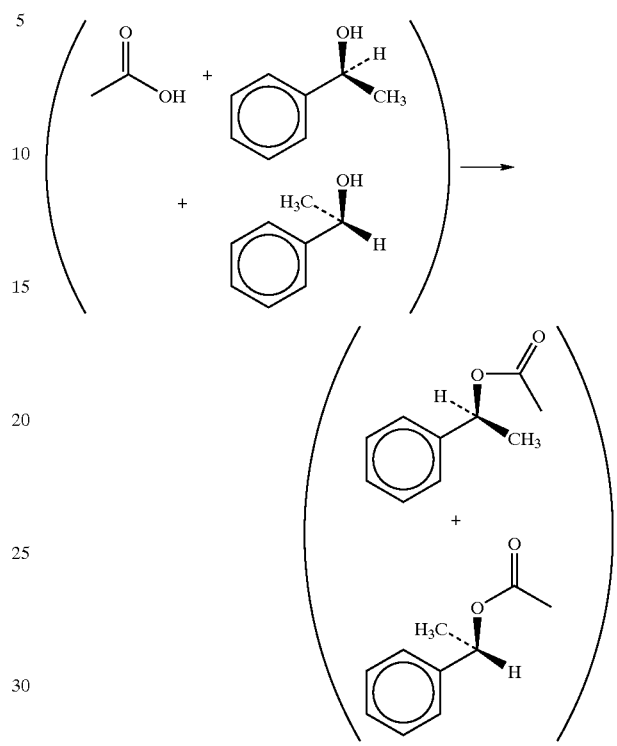

The aforementioned esterification reaction may take place using such esterification catalysts as citric acid or may take place by means of a fermentation reaction using an ester-forming enzyme, preferably *Candida antarctica* esterase expressed in *Asperigilus orzae*, for example NOVOZYM® 435, a triacylglycerol hydrolase (E.C. No. 3.1.1.3) acting as an effective carboxylesterase. NOVOZYM® is a trademark of the Novo Nordisk A/S Organization of Novo Alle, 2880 Bagsvaerd, Denmark.

When carrying out the reductive fermentation reaction, to wit:

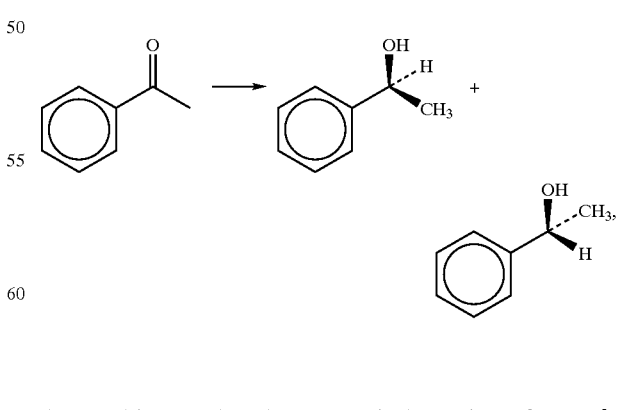

the resulting product has an optical rotation of −38.6°, [α=−38.6°] and an enantiomeric excess percent of about 87.5, [ee%=87.5±0.5].

When carrying out the esterification reaction, to wit:

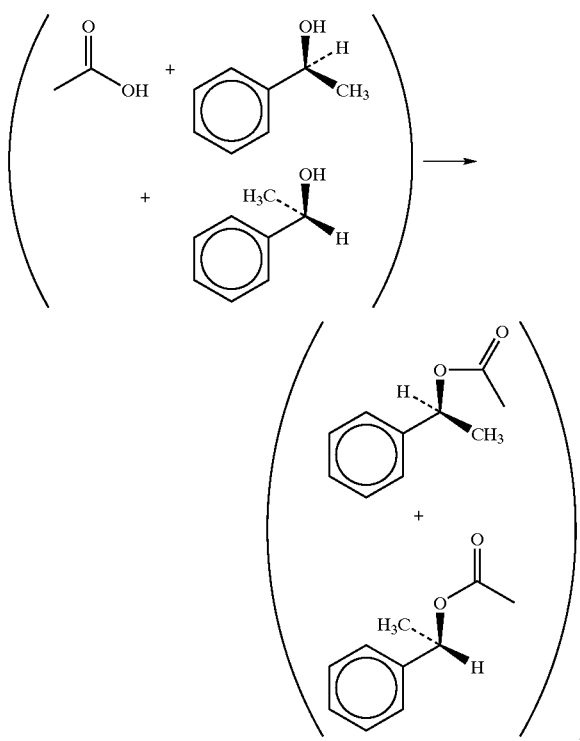

using a citric acid catalyst, the resultant stereoisomer mixture has an optical activity of −102.7°, [α=−102.7°] with an enantiomeric excess percent of about 78.31, [εε%= 78.31±0.5].

When carrying out the esterification reaction, to wit:

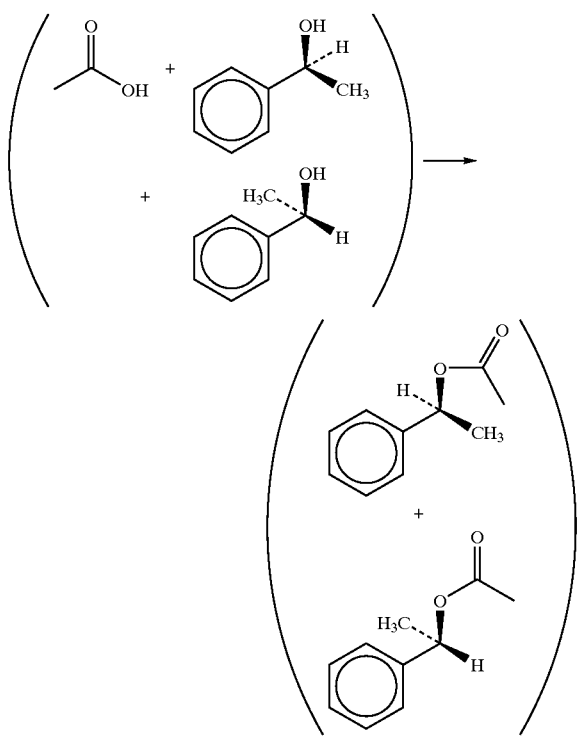

using the enzyme *Candida antarctica* esterase expressed in *Asperigilus orzae*, specifically NOVOZYM® 435, a triacylglycerol hydrolase (E.C. No. 3.1.1.3) acting as an effective carboxylesterase, a mixture of stereoisomers having an optical activity of +73.06° is produced ([α=+73.06°]) with an enantiomeric excess percent of about 81.1, [εε%= 81.1±0.5].

The mixture of optical isomers of the styralyl alcohol having the structures:

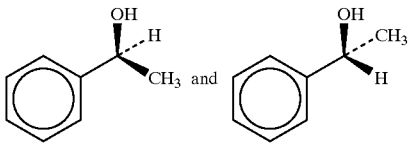

produced as set forth above having an optical rotation of −38.6°, [α=−38.6°] with an enantiomeric excess percent of about 87.5, [εε%=87.5±0.5] has a mild hyacinth, gardenia aroma with strawberry nuances. It is, accordingly, useful in augmenting, enhancing and imparting aroma in or to floral fragrances and is useful in the creation of strawberry-flavored foodstuffs; e.g., strawberry-flavored gelatin desserts, strawberry-flavored chewing gums and strawberry-flavored fruit preparations for yogurt.

The mixture of stereoisomers of esters having the structures:

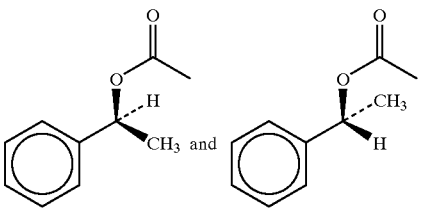

prepared as set forth above using a citric acid catalyst and having an optical rotation of −102.7°, [α=−102.7°] and an enantiomeric excess percent of about 78.31, [εε%= 78.31±0.5] has a fresh strawberry, green, dried fruit aroma with a green, avocado taste profile and strawberry jam nuances. From a fragrance standpoint, this substance is described as having a strawberry, green, dried fruit aroma with strawberry topnotes.

The mixture of stereoisomeric esters having the structures:

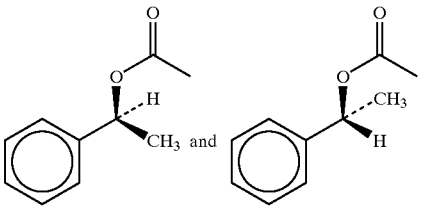

prepared as set forth above using the ester-forming enzyme, *Candida antarctica* esterase expressed in *Asperigilus orzae*, and having an optical rotation of +73.06°, [α=+73.06°] with an enantiomeric excess percent of about 81.1, [εε%= 81.1±0.5] has a fruity, floral, jasmine, mimosa, gardenia aroma with apricot, apple and strawberry jam flavor nuances. This material is also useful in the formation of fruity, floral, jasmine fragrances, as well as strawberry-flavored foodstuffs and food preparations such as strawberry-flavored gelatin desserts, strawberry-flavored ice cream and strawberry-flavored preparations for yogurts.

In carrying out the process for production of the styralyl alcohol stereoisomer mixtures containing stereoisomers having the structures:

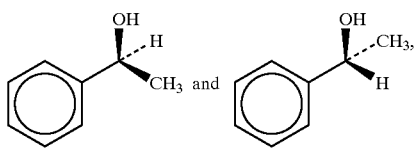

an inoculum preparation is first prepared containing a culture of *Kluyveromyces polysporus* ATCC 22028 and also containing nutrients including dextrose. The inoculum, after incubation, is then placed in a production fermenter which is aerated and agitated at, for example, an aeration rate of 0.25 v/v/m; at a temperature of, for example, 25° C.; and at an agitation rate of, for example, 300 rpm for a time period of, for example, 24 hours. As set forth in the Detailed Description of the Invention, infra, the pH range may vary from about 5.5 up to about 6.

The resulting product is then extracted with a solvent such as ethyl acetate, and the solvent extract is then washed in order to bring the pH up to approximately neutral (pH=7). The resulting washed extract is then concentrated and the resulting concentrate is then fractionally distilled. The resulting distillate is then used "as is" for its organoleptic properties or further reacted with acetic acid according to the reaction:

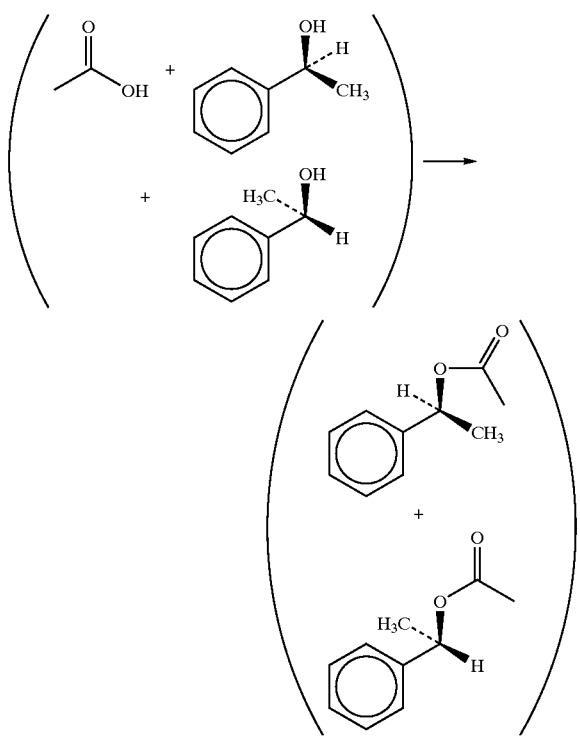

When carrying out the reaction using a citric acid catalyst, the resulting distillate is admixed with acetic acid and citric acid, and the resulting mixture is refluxed for about 15 hours while excess acetic acid is recovered. At the end of the 15 hour period, the resulting product is fractionally distilled.

When carrying out the esterification reaction, to wit:

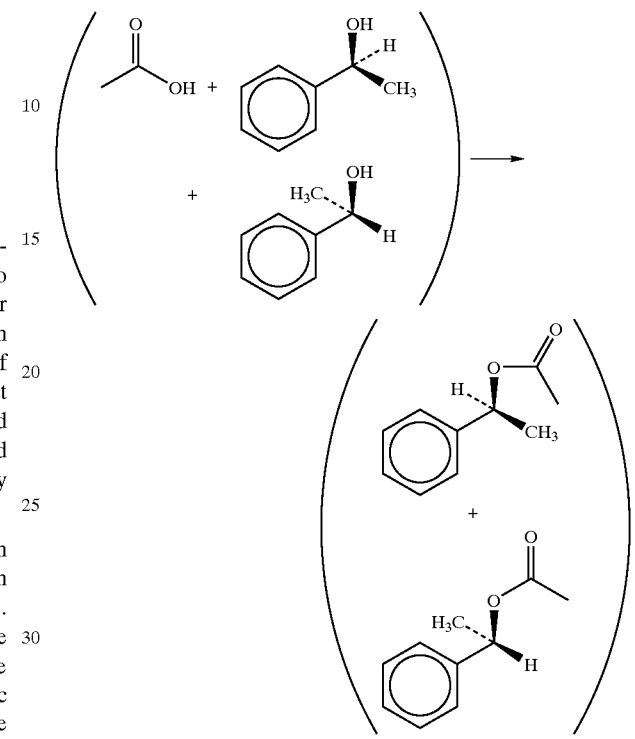

using the ester-forming enzyme, *Candida antarctica* esterase expressed in *Asperigilus orzae*, specifically, NOVOZYM® 435, the mixture of styralyl alcohol stereoisomers having the structures:

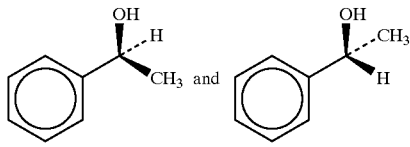

is admixed with a small amount of water and a small amount of NOVOZYM® 435. The resulting mixture is heated to 40° C. and acetic acid is then added over a period of between about 5 and about 10 hours and then continuously stirred for an additional 40–60 hours. The conversion using the "enzyme" process is between about 2.5 and about 3.5%. The resulting product is then fractionally distilled at a pressure of 5 mm/Hg. and at a head temperature of 34–38° C.

BRIEF DESCRIPTION OF THE DRAWINGS

The present invention will be further understood with reference to the accompanying drawings wherein:

FIG. 1A is a GC-mass spectrum for the reaction product for Example I containing the mixture of stereoisomers having the structures:

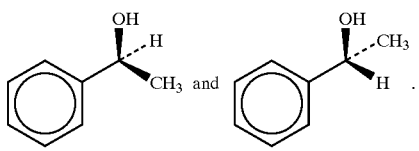

FIG. 1B is another GC-mass spectrum for the mixture of stereoisomers having the structures:

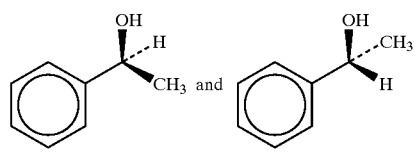

produced according to Example I.

FIG. 1C is a GLC profile for the reaction product of Example I containing a mixture of stereoisomers having the structures:

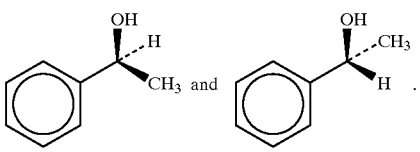

FIG. 1D is a mass spectrum for the product of Example I containing a mixture of stereoisomers having the structures:

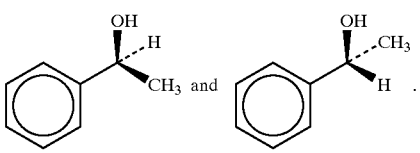

FIG. 1E is a GLC profile for the reaction product of Example I containing the stereoisomers having the structures:

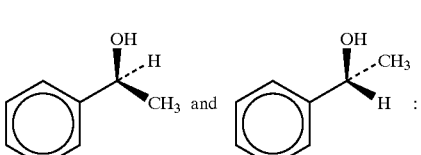

FIG. 1F is a mass spectrum for the reaction product of Example I containing the stereoisomers having the structures:

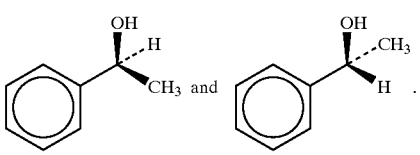

FIG. 2A is a GLC profile for the reaction product of Example II containing the stereoisomers having the structures:

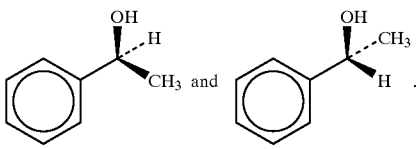

FIG. 2B is a "history plot" for the product formed according to the process of Example II which contains and consists essentially of the stereoisomers having the structures:

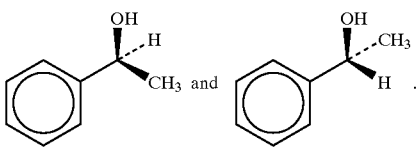

FIG. 2C is a GC-mass spectrum for the reaction product of Example II containing the stereoisomers having the structures:

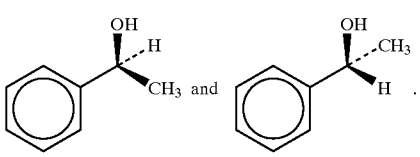

FIG. 2D is a GC-mass spectrum for the reaction product of Example II containing the stereoisomers having the structures:

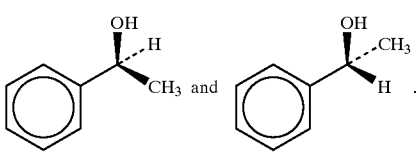

FIG. 3A is a chiral chromatogram for the reaction product of Example IV containing the stereoisomers having the structures:

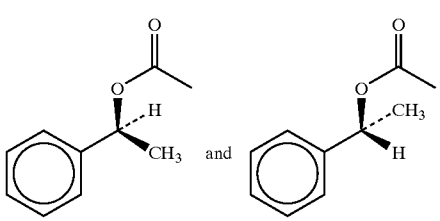

with the optical rotation of +73.06°, [=+73.06] and with an enantiomeric excess percent of about 81.1, [ee%= 81.1±0.51].

FIG. 3B is another chiral GC chromatogram for the reaction product of Example IV containing a mixture of stereoisomers having the structures:

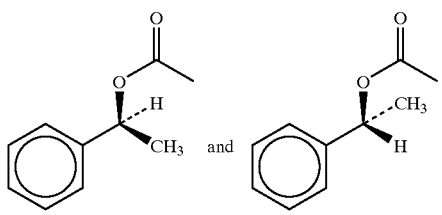
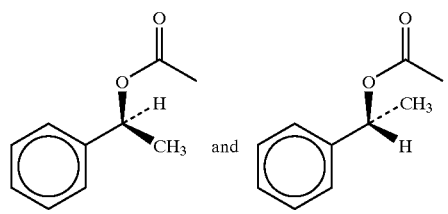

with an optical rotation of +73.06°, [α=+73.06°] and having an enantiomeric excess percent of about 81.1, [εε%=81.1±0.5].

FIG. 3C is a GLC profile for the reaction product of Example IV containing stereoisomers having the structures:

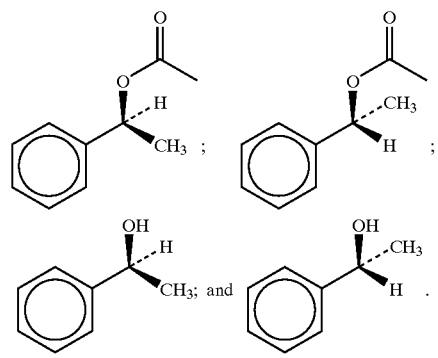

FIG. 4 represents a cutaway side elevation view of apparatus used in forming perfumed polymers which contain embedded therein at least one of the stereoisomers having one of the structures:

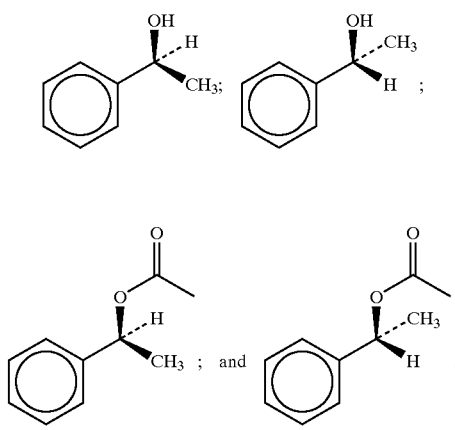

FIG. 5 is a front view of the apparatus of FIG. 4 looking in the direction of the arrows along lines 5—5.

FIG. 6A is a GC-mass spectrum (using a Carbowax column) for the reaction product of Example III containing a mixture of stereoisomers having the structures:

with the mixture having an optical rotation of −102.7°, [α=−102.7°] and having an enantiomeric excess percent of about 78.31, [εε%=78.31±0.5].

FIG. 6B is a GC-mass spectrum for the reaction product of Example III (using an OV-1 column) containing the stereoisomers having the structures:

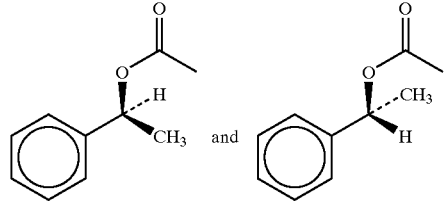

with the mixture having an optical rotation of −102.7°, [α=−102.7°] and an enantiomeric excess percent of about 78.31, [εε%=78.31±0.5].

DETAILED DESCRIPTION OF THE DRAWINGS

Referring to FIG. 1D, the peak indicated by reference numeral 10 is the peak for acetic acid. The peak indicated by reference numeral 11 is the peak for ethyl acetate. The peak indicated by reference numeral 12 is for isobutyl alcohol. The peak indicated by reference numeral 13 is for 3-methyl-butanol. The peak indicated by reference numeral 14 is for a mixture of acetophenone and the mixture of stereoisomers having the structures:

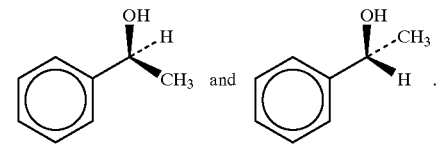

The peak indicated by reference numeral 15 is for phenylethyl alcohol having the structure:

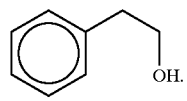

The peak indicated by reference numeral 16 is for the mixture of stereoisomers having the structures:

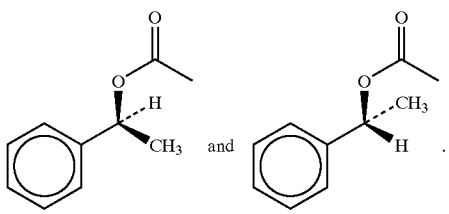

The peak indicated by reference numeral 17 is the peak for acetophenone. The peak indicated by reference numeral 18 is for the compound having the structure:

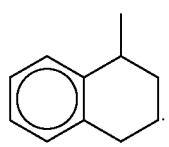

The peak indicated by reference numeral 19 is the peak for β-phenylethyl acetate having the structure:

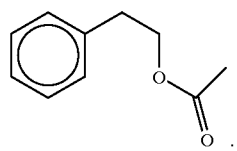

Referring to FIG. 1F, the peak indicated by reference numeral 20 is the peak for ethyl acetate. The peak indicated by reference numeral 21 is for isobutyl alcohol. The peak indicated by reference numeral 22 is for 3-methyl-butanol. The peak indicated by reference numeral 23 is for acetic acid. The peak indicated by reference numeral 24 is for 2-methyl-propionic acid. The peak indicated by reference numeral 25 is for acetophenone. The peak indicated by reference numeral 26 is for the mixture of stereoisomers having the structures:

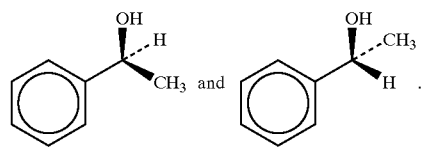

The peak indicated by reference numeral 27 is the peak for β-phenylethyl alcohol having the structure:

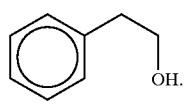

Referring to FIG. 3A, the peaks indicated by reference numerals 31 and 32 are for the stereoisomers having the structures:

The peak indicated by reference numeral 30 is for the mixture of stereoisomers having the structures:

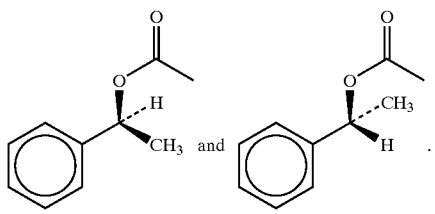

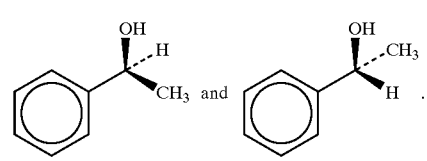

With reference to FIG. 3B, the peaks indicated by reference numerals 34 and 35 are for the stereoisomers having the structures:

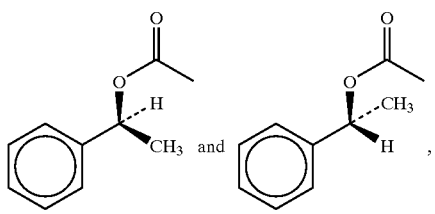

separately. The peak indicated by reference numeral 33 is for the mixture of stereoisomers having the structures:

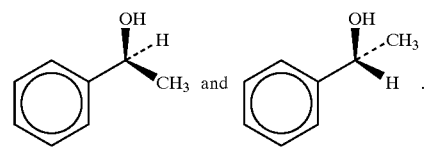

With reference to FIG. 3C, the peak indicated by reference numeral 36 is the peak for the mixture of stereoisomers having the structures:

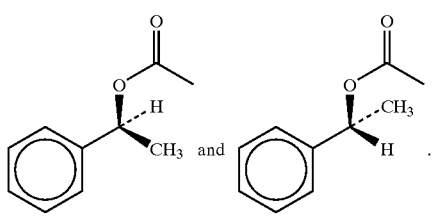

The peak indicated by reference numeral 37 is the peak for the mixture of stereoisomers having the structures:

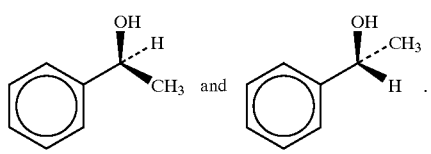

Referring to FIGS. 4 and 5, there is provided a process for forming scented polymer elements (wherein the polymer may be a thermoplastic polymer such as low density polyethylene or polypropylene or copolymers of ethylene and vinyl acetate or mixtures of polymers and copolymers such as copolymers of ethylene and vinyl acetate and polyethylene) such as pellets useful in the formation of plastic particles useful in fabricating certain articles which may be perfumed. This process comprises heating the polymer or mixture of polymers to the melting point of said polymer or mixture of polymers, e.g., 250° C. in the case of low density polyethylene. The lower most portion of the container is maintained at a slightly lower temperature, and the material in the container is taken off at such location for delivery through the conduit (indicated by reference numeral 218). Thus, referring to FIGS. 4 and 5 in particular, the apparatus used in producing such elements comprises a device for forming the polymer containing perfume, e.g., polyethylene or polyethylene-polyvinyl acetate or mixtures of same or polypropylene, which comprises a vat or container 212 into which the polymer taken alone or in admixture with other copolymers and the perfuming substance, which is at least one of the stereoisomers having one of the structures:

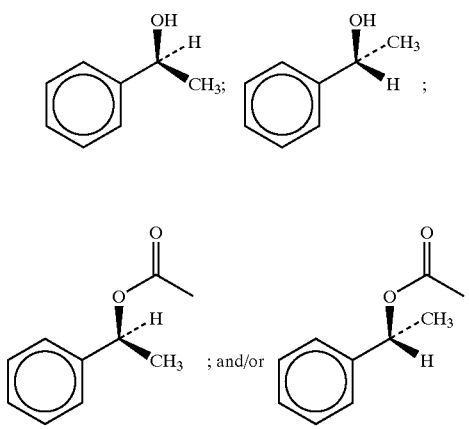

of our invention and other compatible perfumes, is placed. The container is closed by means of an airtight lid 228 and clamped to the container by bolts 265. A stirrer 273 traverses the lid or cover 228 in an airtight manner and is rotatable in a suitable manner. A surrounding cylinder 212A having heating coils which are supplied with electric current through cable 214 from a rheostat or control 216 is operated to maintain the temperature inside the container 212 such that the polymer in the container will be maintained in the molten or liquid state. It has been found advantageous to employ polymers at such a temperature that the viscosity will be in the range of 90–100 Saybolt seconds. The heater is operated to maintain the upper portion. of the container 212 within a temperature range of, for example, 220°–270° C. in the case of low density polyethylene. The bottom portion of the container 212 is heated by means of heating coils 212A regulated through the control 220 connected thereto through a connecting wire 222 to maintain the lower portion of the container 212 within a temperature range of 220°–270° C.

Thus, the polymer or mixture of polymers added to the container 212 is heated from 10–12 hours, whereafter the perfume composition or perfume material which contains one or more of the stereoisomers having the structures:

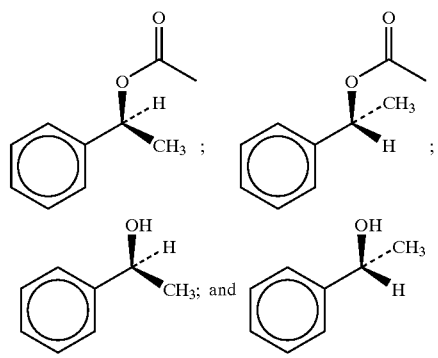

of our invention is quickly added to the melt. Generally, about 10–45% by weight of the resulting mixture of the perfumery substance is added to the polymer.

After the perfume material is added to the container 212, the mixture is stirred for a few minutes, for example, 5–15 minutes, and maintained within the temperature ranges indicated previously by the heating coils 212A. The controls 216 and 220 are connected through cables 224 and 226 to a suitable supply of electric current for supplying the power for heating purposes.

Thereafter, the valve "V" is opened permitting the mass to flow outwardly through conduit 232 (also shown by reference numeral 218 (in cutaway cross section)) having a multiplicity of orifices 234 adjacent to the lower side thereof. The outer end of the conduit 232 is closed so that the liquid polymer in intimate admixture with one or more of the stereoisomers having one of the structures:

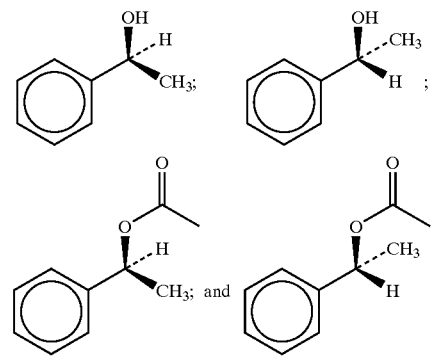

and one or more other substances (if desired) will continuously drop through orifices 234 downwardly from the conduit 232. During this time, the temperature of the polymer intimately admixed with the perfumery substance in the container 212 is accurately controlled so that a temperature in the range of form about 240°–250° C., for example (in the case of low density polyethylene) will exist in the conduit 232. The regulation of the temperature through the controls 216 and 220 is essential in order to insure temperature balance to provide for the continuous dripping or dropping of molten polymer intimately admixed with the perfume substance which contains one or more of the stereoisomers having one of the structures:

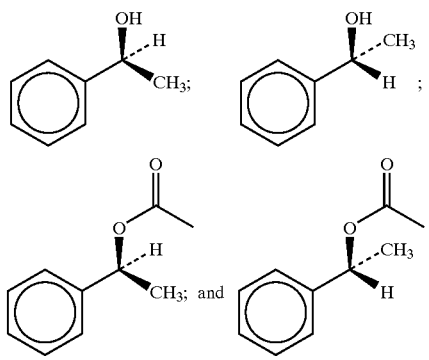

of our invention, through the orifices 234 at a rate which will insure the formation of droplets 236 which will fall downwardly onto a moving conveyor belt 238 caused to run between conveyor wheels 240 and 242 beneath the conduit 232.

When the droplets 236 fall onto the conveyor 238, they form pellets 244 which harden almost instantaneously and fall off the end of the conveyor 238 into a container 245 which is advantageously filled with water 252 or some other suitable cooling liquid to insure the rapid cooling of each of the pellets 244. The pellets 244 are then collected from the container 245 and utilized for the formation of other functional products, e.g., garbage bags and the like.

A feature of the invention is the provision for the moistening of the conveyor belt 238 to insure the rapid formation of the solid polymer-aromatizing agent containing pellets 244 without sticking to the belt. The belt 238 is advantageously of a material which will not normally stick to a melted polymer, but the moistening means 248 insures a sufficiently cold temperature of the belt surface for the adequate formation of the pellets 244. The moistening means comprises a container 250 which is continuously fed with water 252 to maintain a level 254 for moistening a sponge element 256 which bears against the exterior surface of the belt 238.

DETAILED DESCRIPTION OF THE INVENTION

The reactions according to the present invention are shown thusly:

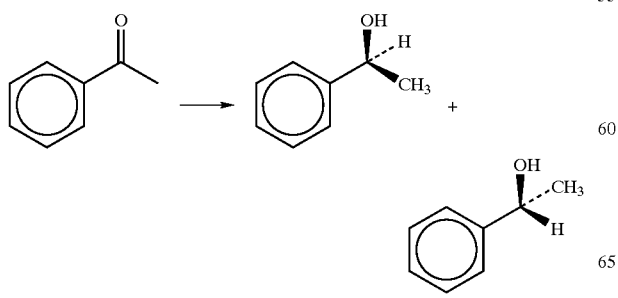

and

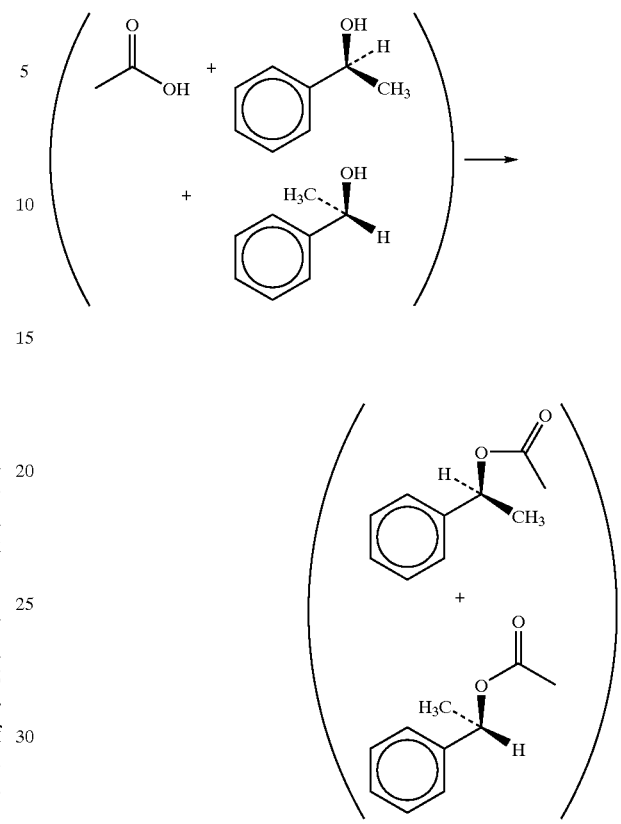

More specifically, the first reaction involving reduction of a ketone group to form a secondary alcohol is carried out in the presence of *Kluyveromyces polysporus* ATCC 22028.

The process is carried out by first introducing an inoculum containing the said *Kluyveromyces polysporus* ATCC 22028 into a reaction vessel which contains a production medium, typically including a nutrient source, a buffering agent such as $KH_2PO_4$, a yeast extract and other nutrient sources which may include trace minerals and growth factors.

Immediately, subsequent to the introduction of the inoculum, a source of dextrose in a suitable nutrient medium is begun feeding into the reaction vessel (and throughout the entire fermentation procedure).

Up to about 30 hours after inoculation, acetophenone having the structure:

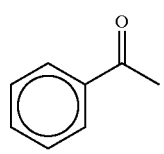

is pumped into the reaction vessel. Incubation is then continued at a temperature in the range of 20° C. up to 30° C., at an agitation rate of from about 250 up to about 350 rpm and an aeration rate of from about 0.20 up to about 0.40 v/v/m. Conversion to the resulting mixture of stereoisomers having the structures:

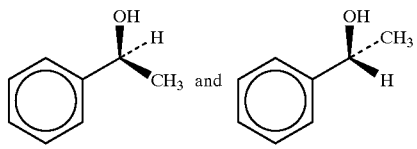

is monitored by means of GC.

At the conclusion of the fermentation, the fermentation broth is pasteurized for a period of between about 30 up to about 70 minutes at a temperature of between about 60° C. and about 75° C., cooled and stored. The crude product is recovered by extraction of the whole broth using an equal volume of a suitable solvent, preferably ethyl acetate. The spent broth is extracted a second time and the recovered ethyl acetate layers are combined and washed with aqueous sodium chloride, preferably. The solvent is then evaporated using such equipment as a rotary evaporator at a water bath temperature in the range of from about 35° C. up to about 50° C. under vacuum. The crude extract is then further purified, if desired, for use for its organoleptic properties; or, in the alternative, the crude extract may be converted to styralyl acetate directly without any further purification; or, optionally, the resulting distillate can be converted to styralyl acetate.

Using the aforementioned procedure, the optical rotation of the resulting mixture of stereoisomers having the structures:

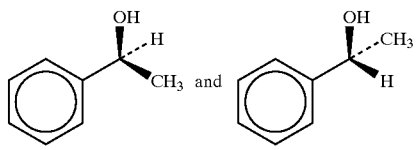

is −38.6° with an enantiomeric excess percent of about 87.5, [εε%=87.5±0.5].

The aforementioned term is intended to mean that the enantiomeric excess percent is between 87 and 88%.

If desired, the resulting mixture of stereoisomers having the structures:

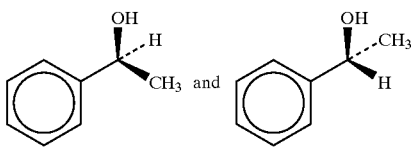

may further be reacted with acetic acid in order to form the resulting esters having the structures:

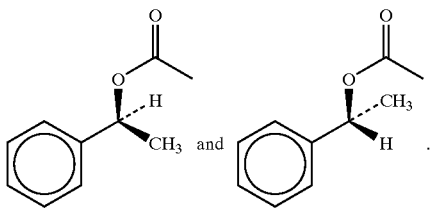

As stated, supra, and as exemplified, infra, the aforementioned esters may be formed, in the alternative, into a mixture of stereoisomers having an optical rotation of −102.7°, [α=−102.7°] with an enantiomeric excess percent of about 78.31, [εε%=78.31±0.5] when carrying out the esterification with a citric acid catalyst or the mixture of esters may have an optical rotation of +73.06° with an enantiomeric excess percent of about 81.1, [εε%=81.1±0.5] when using an ester-forming enzyme which is *Candida antarctica* esterase expressed in *Asperigilus orzae*, preferably NOVOZYM® 435, a triacylglycerol hydrolase (E.C. No. 3.1.1.3) acting as an effective carboxylesterase.

When carrying out the reaction:

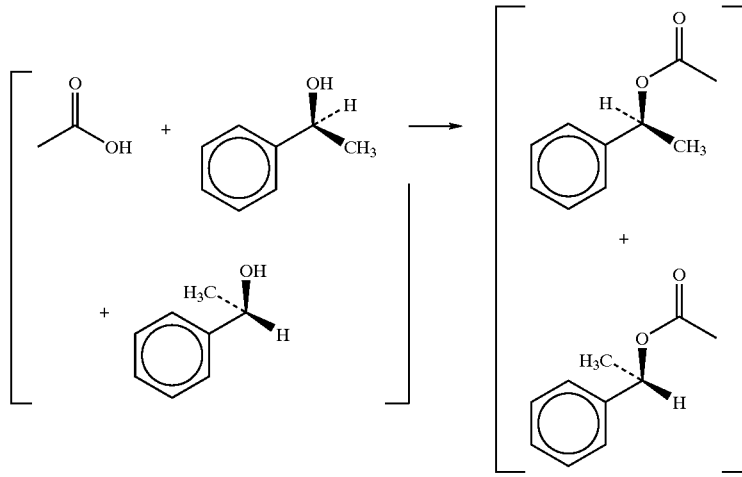

using a citric acid catalyst, excess acetic acid is admixed with the stereoisomers having the structures:

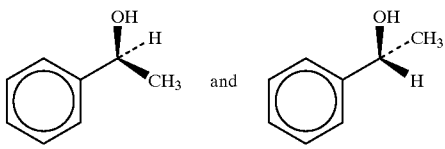

and a small amount of citric acid, e.g., approximately 0.1% of the weight of the entire reaction mass. The resulting mixture is then refluxed for a period of time of between about 10 up to about 30 hours. During such refluxing, a substantial quantity of the excess acetic acid is recovered by means of azeotropic distillation with water of reaction. The reaction is carried out at a reflux temperature of approximately 115–120° C. at atmospheric pressure.

At the end of the reaction, the reaction product is fractionally distilled to yield a mixture of isomers having the structures:

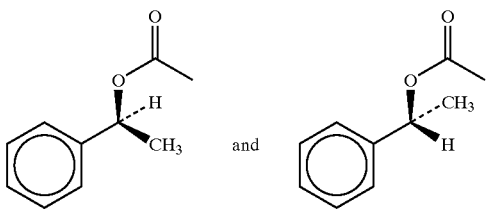

wherein the mixture has an optical rotation of −102.7°, [α=−102.7°] with an enantiomeric excess percent of about 78.31, [ϵϵ%=78.31±0.5].

In the alternative, in place of the citric acid catalyst, a fermentation esterification can be carried out using the ester-forming enzyme, *Candida antarctica* esterase expressed in *Asperigilus orzae*, preferably NOVOZYM® 435, a triacylglycerol hydrolase (E.C. No. 3.1.1.3) acting as an effective carboxylesterase.

In carrying out the reaction using the ester-forming enzyme, the reaction may be carried out with the ester-forming enzyme, the acetic acid and the styralyl alcohol with a small amount of water, or the reaction may be carried out in the presence of an inert solvent such as hexane. We have found that when using the inert solvent such as hexane, a higher conversion is achieved. Thus, initially, styralyl alcohol, water and the ester-forming catalyst are initially admixed and the resulting mixture is heated to a temperature of between about 35° C. and 45° C. The resulting mixture is then further admixed with acetic acid which is added over a period of between about 5 and 10 hours while maintaining the reaction mass at 40° C. Optionally, solvents such as hexane may be introduced into the mixture of styralyl alcohol and water prior to the introduction of acetic acid. When a solvent such as hexane is utilized, the conversion of the styralyl alcohol to the ester is between about 7 and about 10%. However, when such solvent is not used, the conversion is between about 2.5 up to about 3.5%.

Accordingly, it is preferred that a solvent such as n-hexane be utilized in carrying out the esterification reaction using an ester-forming enzyme. The amount of such solvent as n-hexane is approximately equal to the weight of styralyl alcohol in the reaction mass.

The mixtures of stereoisomers of styralyl alcohol and styralyl acetate obtained in accordance with the present invention and one or more auxiliary perfume ingredients including, for example, hydrocarbons, alcohols other than the styralyl alcohols of our invention, ketones, aldehydes, nitriles, esters other than the styralyl acetates of our invention, ethers, synthetic essential oils, lactones and natural essential oils may be admixed so that the combined odors of the individual components produce a pleasant and desired fragrance, particularly and preferably in the fruity and floral area (e.g., jasmine and gardenia aromas). Such perfume compositions usually contain (a) the main note or the "bouquet" or foundation stone of the composition; (b) modifiers which round off and accompany the main note; (c) fixatives which include odorous substances which lend a particular note to the perfume throughout all stages of evaporation and substance which retard evaporation; and (d) topnotes which are usually low boiling, fresh-smelling materials.

In perfume compositions, it is the individual compositions which contribute to their particular olfactory characteristics; however, the overall sensory effect of the perfume compositions will be at least the sum total of the effects of each of the ingredients. Thus, one or more of the styralyl acetate or styralyl alcohol stereoisomer mixtures of our invention can be used to alter, modify or enhance the aroma characteristics of a perfume composition, for example, by utilizing or moderating the olfactory reaction contributed by another ingredient in the composition.

The amount of styralyl alcohol or styralyl acetate stereoisomer composition of our invention, which will be effective in perfume compositions as well as in perfumed articles and colognes, depends upon many factors including the other ingredients, their amounts and the effects which are desired. It has been found that perfume compositions containing as little as 0.005% of the styralyl alcohol or styralyl acetate stereoisomers or even less (e.g., 0.0025%) can be used to impart green, floral, hyacinth, gardenia, jasmine, mimosa, fruity, dried fruit and strawberry aromas with green, fruity, strawberry, "fresh air-dried clothing" topnotes to soaps, cosmetics, detergents including anionic, cationic, nonionic and zwitterionic solid or liquid detergents, perfumed polymers and other products. The amount employed can range up to 70% of the fragrance and will depend upon consideration of cost, nature of the end product, the effect desired on the finished product and the particular fragrance sought.

The mixtures of styralyl alcohol stereoisomers and styralyl acetate stereoisomers of this invention are useful when taken alone or taken together with other perfumery ingredients in detergents, soaps, space ordorants and deodorants, perfumes, colognes, toilet waters, bath preparations, hair preparations such as lacquers, brilliantines, pomades, shampoos; cosmetic preparations such as creams, deodorants, hand lotions and sun screens; powder such as talcs, dusting powders, face powders and the like.

As little as 0.25% of the mixtures of styralyl alcohol stereoisomers or styralyl acetate stereoisomers can suffice to impart intense and substantive green, floral, hyacinth, gardenia, jasmine, mimosa, fruity, dried fruit and strawberry aromas with green, fruity, strawberry and "fresh air-dried clothing" topnotes to floral and fruity perfume formulations. Generally, no more than 5% of the mixtures of styralyl alcohol stereoisomers or styralyl acetate stereoisomers based on the ultimate end product is required to be used in the perfume compositions.

Furthermore, as little as 0.25% of the mixture of styralyl alcohol stereoisomers or styralyl acetate stereoisomers can suffice to impart such aromas to perfumed articles, per se, whether in the presence of other perfume materials or whether used by themselves. Thus, the range of use of the mixtures of styralyl alcohol stereoisomers or styralyl acetate stereoisomers of this invention in perfumed articles, e.g., perfumed polymers and solid or liquid anionic, cationic, nonionic or zwitterionic solid or liquid detergents may vary from 0.25% up to about 5% by weight based on the total weight of the perfumed article.

In addition, the perfume composition or fragrance composition of our invention can contain a vehicle or carrier for the mixture of styralyl alcohol stereoisomers or styralyl acetate stereoisomers of our invention. The vehicle can be a liquid such as a nontoxic alcohol (e.g., ethanol); a nontoxic glycol (e.g., propylene glycol) or the like. The carrier can also be an absorbent solid such as a gum (e.g., gum arabic, xanthan gum or guar gum) or components for encapsulating the composition by means of coacervation (such as by gelatin) or by means of the formation of a polymer around a liquid center. This can be accomplished by using a urea formaldehyde prepolymer to form a polymeric capsule around a liquid perfume composition center as is known in the prior art.

It will be appreciated from the present disclosure that the mixtures of styralyl alcohol stereoisomers or styralyl acetate stereoisomers according to the present invention can be used to alter, vary, fortify, modify, enhance or otherwise improve the flavor of a wide variety of materials which are ingested, consumed or otherwise organoleptically sensed.

The terms "alter" and "modify" in their various forms will be understood herein to mean the supplying or imparting of a flavor character or note to an otherwise bland, relatively tasteless substance or augmenting an existing flavor characteristic where the natural flavor is deficient in some regard or supplement the existing flavor impression to modify its organoleptic character.

The term "enhance" is intended herein to mean the intensification (by use of the mixtures of styralyl alcohol stereoisomers or styralyl acetate stereoisomers of this invention) of a flavor, aroma note or nuance in a foodstuff, perfume composition or perfumed article without changing the quality of said note or nuance.

A "flavoring composition" as referred to herein means one which contributes a part of the overall flavor impression by supplementing or fortifying a natural or artificial flavor in a material or one which supplies substantially all the flavor and/or aroma character to a consumable article.

The term "foodstuff" as used herein includes both solid and liquid ingestible material for man or animals, which materials usually do, but need not have nutritional value. Thus, foodstuffs include meats; gravies; soups; convenience foods; malt; alcoholic and other beverages; milk and dairy products; seafood including fish, crustaceans, mollusks and the like; candies; vegetables; cereals; soft drinks; snacks; dog and cat foods; other veterinary products and the like.

When the mixtures of styralyl alcohol stereoisomers or styralyl acetate stereoisomers of this invention are used in a flavoring composition, they can be combined with conventional flavoring materials or adjuvants. Such co-ingredients or flavoring adjuvants are well known in the art for such and have been extensively described in the literature. Requirements of such adjuvant materials are:

(1) that they be nonreactive with the styralyl alcohol stereoisomer mixtures or styralyl acetate stereoisomer mixtures of this invention;

(2) that they be organoleptically compatible with the mixtures of styralyl alcohol stereoisomers or styralyl acetate stereoisomers of this invention whereby the flavor of the ultimate consumable material to which the styralyl alcohol stereoisomers or styralyl acetate stereoisomers are added is not detrimentally affected by the use of the adjuvant; and (3) that they be ingestible, acceptable and thus nontoxic or otherwise nondeleterious.

Apart from these requirements, conventional materials can be used and broadly include other flavor materials, vehicles, stabilizers, thickeners, surface active agents, conditioners and flavor intensifiers.

Such conventional flavoring materials include saturated fatty acids; unsaturated fatty acids and amino acids; alcohols (other than the styralyl alcohol stereoisomers of our invention) including primary and secondary alcohols; esters (other than the styralyl acetate stereoisomer mixtures of our invention); carbonyl compounds including ketones and aldehydes; lactones; other cyclic organic materials including benzene derivatives, alicyclic compounds, heterocyclics such as furans, pyridines, pyrazines and the like; sulfur-containing compounds including thiols, sulfides, disulfides and the like; proteins; lipids; carbohydrates; so-called flavor potentiators such as monosodium glutamate, magnesium glutamate, calcium glutamate, guanylates, and inosinates; natural flavoring materials such as cocoa, vanilla and caramel; essential oils and extracts such as anise oil, clove oil and the like; and artificial flavoring materials such as vanillin and the like.

Specific preferred flavor adjuvants are as follows:

anise oil;
ethyl-2-methyl butyrate;
vanillin;
cis-3-heptenol;
cis-3-hexenol;
trans-2-heptenol;
cis-3-heptenal;
butyl valerate;
2,3-diethyl pyrazine;
methyl cyclopentenolone;
benzaldehyde;
valerian oil;
3,4-dimethoxyphenol;
amyl acetate;
amyl cinnamate;
γ-butyryl lactone;
furfural;
trimethyl pyrazine;
phenyl acetic acid;
isovaleraldehyde;
ethyl maltol;
ethyl vanillin;
ethyl valerate;
cocoa extract;
coffee extract;
peppermint oil;
spearmint oil;
clove oil;
anethol;
cardamom oil;
wintergreen oil;
cinnamic aldehyde;
ethyl-2-methyl valerate;

γ-hexenyl lactone;
2,4-decadienal;
2,4-heptadienal;
2-methyl-2-pentenoic acid;
2-methyl-3-pentenoic acid;
the ethyl ester of 2-methyl-2-pentenoic acid;
the ethyl ester of 2-methyl-3-pentenoic acid;
the ethyl ester of 2-methyl-4-pentenoic acid;
2-methyl-4-pentenoic acid;
the hexyl ester of 2-methyl-3-pentenoic; and
butylidene phthalide.

The following table sets forth organoleptic properties of the mixtures of styralyl alcohol stereoisomers and styralyl acetate stereoisomers of our invention:

TABLE I

| Description of Composition | Fruit Flavor Properties | Fragrance Properties |
|---|---|---|
| Mixture of stereoisomers having the structures: 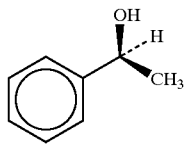 and 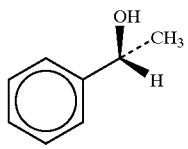 having an optical rotation of −38.6° [α = −38.6°] and an enantiomeric excess percent of about 87.5, [εε % = 87.5 ± 0.5]. | A strawberry flavor. | A hyacinth, gardenia aroma with strawberry topnotes. |
| Mixture of stereoisomers having the structures: 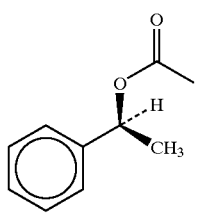 and 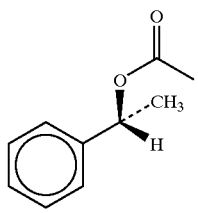 having an optical rotation of +73.06°, [α = +73.06°] and an enantiomeric excess percent of about 81.1, [εε % = 81.1 ± 0.5]. | A strawberry jam, apricot and apple flavor. | A fruit, floral, jasmine, mimosa and gardenia aroma with strawberry, fruity and green topnotes. |

TABLE I-continued

| Description of Composition | Fruit Flavor Properties | Fragrance Properties |
|---|---|---|
| Mixture of stereoisomers having the structures:<br>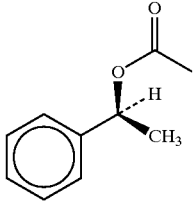<br>and<br>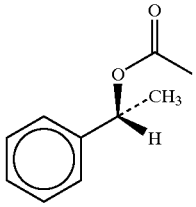<br>having an optical rotation of −102.7°, [α = −102.7°] and an enantiomeric excess percent of about 78.31, [εε % = 78.31 ± 0.5]. | A strawberry jam, green, dried fruit, avocado taste. | A strawberry, green, dried fruit aroma with strawberry, green, "fresh air-dried clothing" topnotes. |

The following Examples I, II, III and IV illustrate methods of our invention used to produce the mixtures of stereoisomers of styralyl alcohol and mixtures of stereoisomers of styralyl acetate of our invention. Examples V, et seq, serve to illustrate the organoleptic utilities of the mixtures of stereoisomers of styralyl alcohol and mixtures of stereoisomers of styralyl acetate of our invention. All parts and percentages given herein are by weight unless otherwise specified.

EXAMPLE I

PRODUCTION OF STYRALYL ALCOHOL IN LABORATORY FERMENTERS

I. Inoculum Preparation

A. Medium:

The following medium was prepared by admixing the following ingredients:

| g/L | Ingredients |
|---|---|
| 5.0 | AMBERFERM ® 4000 Peptone |
| 5.0 | TASTONE ® 900 |
| 5.0 | KH$_2$PO$_4$ (potassium phosphate, monobasic) |
| 5.0 | Malt extract 102 |
| 0.5 | MgSO$_4$ · 7H$_2$O (magnesium sulfate, heptahydrate) |
| 1 L | Deionized water |
| 50.0 | CERELOSE ® 2001 (added after sterilization) (dextrose) |
| pH = 7.0, adjusted before sterilization with 25% aqueous NaOH solution | |

B. Parameters:

Temperature: 25° C.;

Agitation: 100 rpm; and

Duration: 24 hours.

A 2.8 liter Fernbach flask containing 500 ml of the inoculum medium of A, supra, was sterilized at 121° C. for 30 minutes. The flask was inoculated with 1.8 ml of a frozen culture of *Kluyveromyces polysporus* ATCC 22028; 50.0 ml of sterile 50% dextrose (CERELOSE® 2001) and 2–3 drops of antifoam were added. The flask was inoculated in a shaker (100 rpm) at 25° C. for 24 hours.

II. Production

A. Medium:

The following medium was prepared by admixing the following ingredients:

| g/L | Ingredients |
|---|---|
| 50.0 | AMBERFERM ® 4000 Peptone |
| 50.0 | TASTONE ® 900 |
| 50.0 | Malt extract 102 |
| 50.0 | KH$_2$PO$_4$ (potassium phosphate, monobasic) |
| 5.0 | MgSO$_4$ · 7H$_2$O (magnesium sulfate, heptahydrate) |
| 10.0 | Antifoam Hi MARS-10 ® FGK |
| 11.0 L | Deionized water |
| 500.0 | CERELOSE ® 2001 (added after sterilization) (dextrose) |
| pH = 7.0, adjusted before sterilization with 25% aqueous NaOH solution | |

B. Fermenter Parameters:

Inoculum: 500 ml of propagation culture;

Broth Volume: 11.0 liters;

Temperature: 25° C.;

Aeration: 0.25 v/v/m;

Agitation: 300 rpm (impeller diameter 84 mm); and

Duration: 24 hours.

C. Process:

A total of 10 liters of medium (with an additional 1 liter of water added to make up for steam lost during sterilization) was sterilized in a 23 liter fermenter at 121° C. for 30 minutes. After sterilization, 1 liter of sterile 50% dextrose (CERELOSE® 2001) and 500 ml of a 24 hours-grown inoculum were added. During the fermentation, the sugar was monitored but not adjusted.

After 15.5 hours of incubation, the dextrose and ethanol were determined and the optical density (OD) at 600° of a 1/100 dilution was measured. The cell density (1/100 dilution) reached an optical density of 0.215 at that time. A total of 175 grams of dry dextrose was added and allowed to mix for 15 minutes, after which 57.5 grams of acetophenone were added. Incubation was continued at 25° C., 300 rpm and 0.25 v/v/m aeration. Conversion was monitored by GC. The reaction taking place is as follows:

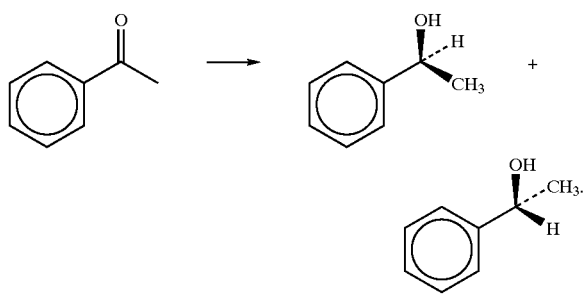

D. Analysis:

Samples of broth were analyzed periodically by GC.

E. Product Recovery:

At the conclusion of the fermentation, the broth was pasteurized for 45 minutes at 65° C., cooled and stored in a refrigerator. The crude product is recovered by extraction of the whole broth using an equal volume of ethyl acetate. The spent broth is extracted a second time, and the recovered ethyl acetate layers are combined and washed two times with saturated aqueous NaCl. The solvent is then evaporated to about 8% using a rotary evaporator with a water bath temperature of 40° C. and a vacuum of 90–100 Torr. The crude extract is then fractionally distilled for use for its organoleptic properties as exemplified, infra; or it is used for conversion to styralyl acetate with or without any further purification. The resulting distilled product has a boiling point at atmospheric pressure of 204° C.; a melting point of 19.5–20.5° C.; a specific gravity of 15° C. of 1.013; and a refractive index at 20° C. of 1.5270.

NMR, GLC, chiral column GC and mass spectral analysis yield the information that the resulting product is a mixture of stereoisomers having the structures:

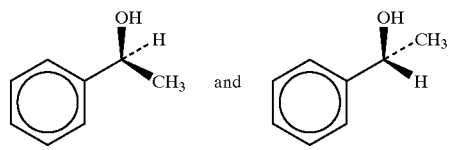

having an optical rotation of −38.6°, [α=−38.6°] and an enantiomeric excess percent of about 87.5, [ee%=87.5±0.5].

EXAMPLE II

PRODUCTION OF STYRALYL ALCOHOL IN PILOT PLANT FERMENTERS

Reaction:

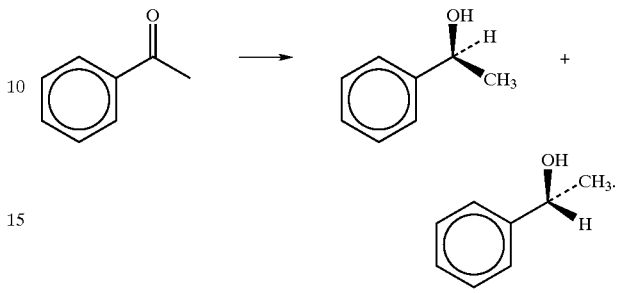

I. Inoculum Preparation

A. Medium:

The following medium is prepared by admixing the following ingredients:

| g/L | Ingredients |
|---|---|
| 5.0 | AMBERFERM ® 4000 Peptone |
| 5.0 | TASTONE ® 900 (yeast extract) |
| 5.0 | Malt extract 102 |
| 5.0 | KH$_2$PO$_4$ (potassium phosphate, monobasic) |
| 0.5 | MgSO$_4$ · 7H$_2$O (magnesium sulfate, heptahydrate) |
| 1 L | Deionized water |
| 1.0 | Antifoam Hi MARS-010 ® FGK |
| 50.0 | CERELOSE ® 2001 (added after sterilization) (dextrose) |
| pH = 7.0, adjusted before sterilization with 25% aqueous NaOH solution | |

B. Parameters:

Temperature: 25° C.;

Agitation: 100 rpm; and

Duration: 24 hours.

A Fernbach flask containing 1 liter of inoculum medium was sterilized for 30 minutes at 121° C. The flask was inoculated with 1.8 ml of a frozen culture of *Kluyveromyces polysporus* ATCC 22028; and 100 ml of sterile 50% dextrose solution were added. The flask was incubated in an incubator shaker (100 rpm) at 25° C. for 24 hours.

II. Seed Culture Preparation

A. Medium:

The following medium was prepared by admixing the following ingredients:

| g/L | Ingredients |
|---|---|
| 100.0 | AMBERFERM ® 4000 Peptone |
| 100.0 | TASTONE ® 900 (yeast extract) |
| 100.0 | Malt extract 102 |
| 100.0 | KH$_2$PO$_4$ (potassium phosphate, monobasic) |
| 10.0 | MgSO$_4$ · 7H$_2$O (magnesium sulfate, heptahydrate) |
| 20.0 L | Deionized water |
| 10.0 | Antifoam Hi MARS-010 ® FGK |
| 1,000.0 | CERELOSE ® 2001 (added after sterilization) |
| pH = 7.0, adjusted before sterilization with 25% NaOH | |

B. Parameters:

Broth Volume: 20 liters;
Temperature: 25° C.;
Agitation: 100 rpm;
Aeration: 0.1 v/v/m (2 liters/minute);
Duration: 24 hours.

20 Liters of inoculum medium were sterilized for 30 minutes in a pilot plant 41 liter fermenter. After cooling, the fermenter was inoculated with 1 liter of cells grown for a period of 24 hours and 2 liters of sterile 50% dextrose were added. The fermenter was run at 25° C., 100 rpm and 0.1 v/v/m aeration for 24 hours. The pH is maintained in the range of from about 5.8 up to about 6.

III. Production

A. Medium:

The following medium was prepared by admixing the following ingredients:

| g/L | Ingredients |
| --- | --- |
| 10.0 | AMBERFERM ® 4000 Peptone |
| 6.0 | TASTONE ® 900 (yeast extract) |
| 7.5 | Malt extract 102 |
| 5.0 | $KH_2PO_4$ (potassium phosphate, monobasic) |
| 0.5 | $MgSO_4 \cdot 7H_2O$ (magnesium sulfate, heptahydrate) |
| 1.0 L | Deionized water |
| 1.0 | Antifoam Hi MARS-010 ® FGK |
| | pH = 7.0, adjusted before sterilization with 25% NaOH |
| 56.6 | CERELOSE ® 2001 (added after sterilization) |
| 30.0 | CERELOSE ® 2001 (added after acetophenone) |
| 38.0 | Inoculum |
| 1.5 | NaOH (sodium hydroxide) |
| 5.0 | Acetophenone |
| 2.1 | Phosphoric acid 85% |

B. Parameters:

Inoculum: 20 liters of propagation culture;
Broth Volume: 530 liters;
Temperature: 25° C.;
Aeration: 0.25 v/v/m;
Agitation: 50 rpm; and
Duration: 40 hours.

C. Process:

530 Liters of production medium were sterilized in the pilot plant 300 gallon fermenter for 30 minutes at 121° C. After sterilization and cooling, 60 liters of sterile 50% CERELOSE® dextrose and 20 liters of 24 hours-grown seed culture were added. The pH is maintained in the range of from about 5.5 up to about 6. After 15.5 hours of incubation, when the optical density is at 600 of a 1/100 broth dilution was 0.171, a total of 15.9 kg dry dextrose powder was added. After 15 minutes of mixing, a total of 2.65 kg of acetophenone was added, and the agitation was increased to 100 rpm.

At the conclusion of the 24 hour incubation period, the broth is cooled for a period of 24 hours to room temperature and then pasteurized for 45 is minutes at 65° C. The broth is then acidified to a pH in the range of 4–4.5 using 85% phosphoric acid, centrifuged and stored.

D. Product Recovery:

The broth is then extracted with ethyl acetate, and the ethyl acetate extract is evaporated. The resulting oil is then fractionally distilled at 204° C. and 1 atmosphere pressure to yield a product having a specific gravity of 1.013 and a refractive index at 20° C. of 1.5270.

The resulting product is a mixture of stereoisomers having the structures:

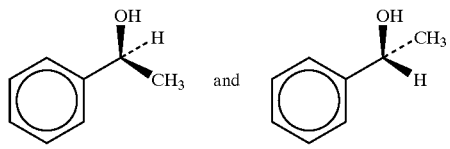

having an optical rotation of −38.6°, [α=−38.6°] and an enantiomeric excess percent of about 87.5, [ee%=87.5±0.5].

EXAMPLE III

PRODUCTION OF STYRALYL ACETATE

Reaction:

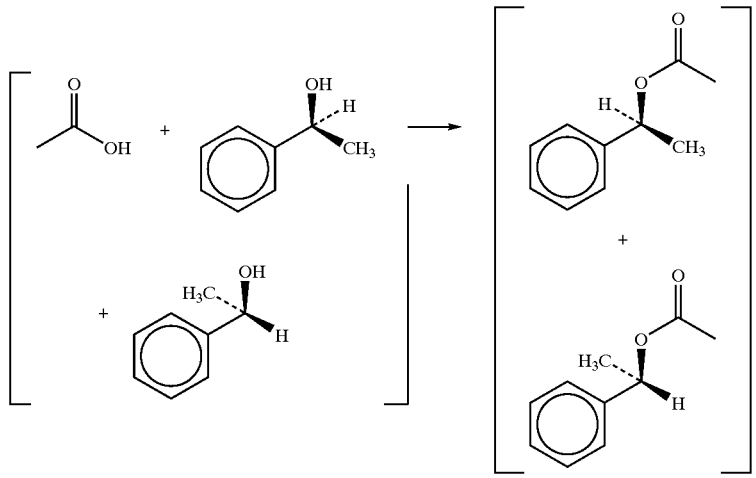

Into a 2 liter reaction vessel equipped with stirrer, thermometer, reflux condenser and additional funnel are placed 118 grams of the crude ethyl acetate extract of Example I, containing 85 grams of styralyl alcohol, a mixture of stereoisomers having the structures:

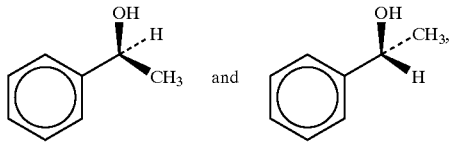

212.5 grams of acetic acid and 0.3 grams of citric acid was refluxed for 15 hours.

During the refluxing, 168 grams of acetic acid were recovered.

The refluxing conditions are 118–120° C. at 5 mm/Hg pressure.

The total of 130 grams crude is recovered and fractionally distilled on a 2 inch×24 inch Goodloe column. Fractions 9–12 are bulked yielding a mixture of stereoisomers having the structures:

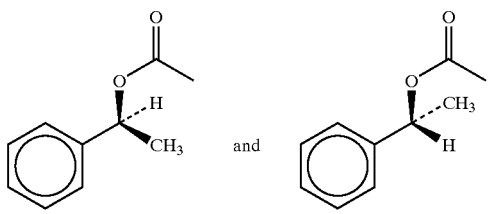

having an optical rotation of −102.7°, [α=−102.7°] and an enantiomeric excess percent of about 78.31, [ee%=78.31±0.5].

EXAMPLE IV

PREPARATION OF STYRALYL ACETATE

Reaction:

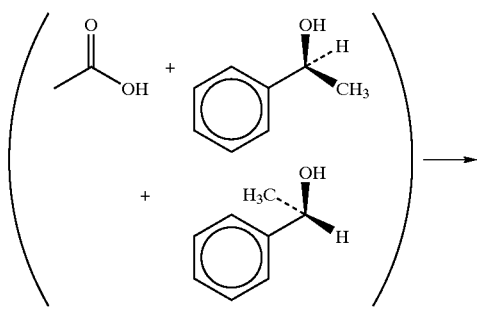

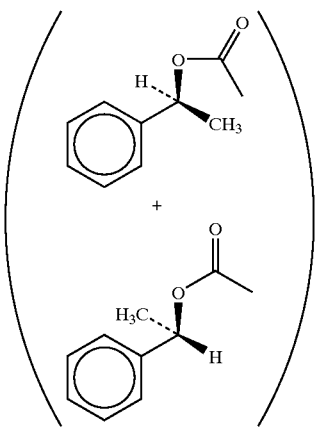

Into a 500 ml flask equipped with stiffer, thermometer, reflux condenser and addition funnel are placed 134 grams of the styralyl alcohol mixture of stereoisomers prepared according to Example II; 0.5 grams water and 3.25 grams NOVOZYM® 435, an ester-forming enzyme which is *Candida antarctica* esterase expressed in *Asperigilus orzae*, a triacylglycerol hydrolase (E.C. No. 3.1.1.3) acting as an effective carboxylesterase (trademark of the Novo Nordisk A/S Organization of Novo Alle, 2880 Bagsvaerd, Denmark).

The resulting mixture with stirring is heated to 40° C. and over a period of 8 hours at a rate of 7.5 grams per hour, 60 grams of acetic acid is added to the reaction mass.

The reaction mass is continued to be stirred for a period of 48 hours while maintaining the temperature at 40° C.

At the end of the 48 hour period, the resulting product is extracted with ethyl acetate and the ethyl acetate extract is concentrated and then fractionally distilled yielding a product, as confirmed by NMR, IR, mass spectral analysis and chiral GC analysis as a mixture of stereoisomers having the structures:

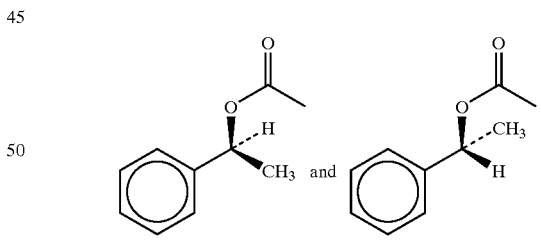

having an optical rotation of +73.06°, [α=+73.06°] and an enantiomeric excess percent of about 81.1, [ee%=81.1±0.5].

The resulting product has a boiling point at atmospheric pressure of 213° C., a specific gravity at 15° C. of 1.024 and a refractive index at 20° C. of 1.4948.

The conversion is 3.12%.

When the above example is carried out using in addition to the aforementioned reagents, 134 grams of n-hexane solvent, the conversion after 48 hours increases to 9.1%.

EXAMPLE V
CEIYPRE FRAGRANCE FORMULATIONS

The following Chypre formulations are prepared:

| Ingredients | Parts by Weight | | |
|---|---|---|---|
| | V(A) | V(B) | V(C) |
| Musk ambrette | 40 | 40 | 40 |
| Musk ketone | 60 | 60 | 60 |
| Coumarin | 30 | 30 | 30 |
| Oil of bergamot | 150 | 150 | 150 |
| Oil of lemon | 100 | 100 | 100 |
| Methyl ionone | 50 | 50 | 50 |
| Hexyl cinnamic aldehyde | 100 | 100 | 100 |
| Hydroxycitronellal | 100 | 100 | 100 |
| Oil of lavender | 50 | 50 | 50 |
| Texas cedarwood oil | 85 | 85 | 85 |
| Virginia cedarwood oil | 30 | 30 | 30 |
| Oil of sandalwood (East Indies) | 40 | 40 | 40 |
| Isoeugenol | 20 | 20 | 20 |
| Eugenol | 10 | 10 | 10 |
| Benzyl acetate | 30 | 30 | 30 |
| beta-Phenyl ethyl alcohol | 40 | 40 | 40 |
| alpha-phenyl ethyl alcohol | 30 | 30 | 30 |
| Oakmoss absolute | 30 | 30 | 30 |
| Vetiver oil of Venezuela | 25 | 25 | 25 |
| The mixture of stereoisomers defined according to the structures: | 25 | 0 | 0 |

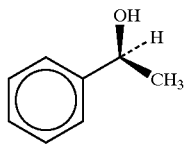

and

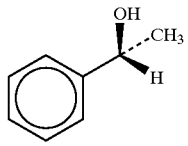

prepared according to Example I, optical rotation −38.6°, [α = −38.6°] with an enantiomeric excess percent of about 87.5, [εε % = 87.5 ± 0.5].

| | | | |
|---|---|---|---|
| The mixture of stereoisomers having the structures: | 0 | 25 | 0 |

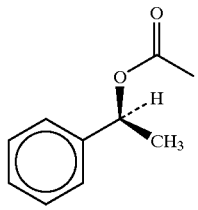

and

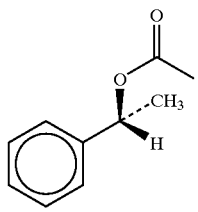

prepared according to Example III, having an optical rotation of −102.7°, [α = −102.7°] with an enantiomeric excess percent of about 78.31, [εε % = 78.31 ± 0.5].

| Ingredients | Parts by Weight | | |
|---|---|---|---|
| | V(A) | V(B) | V(C) |
| The mixture of stereoisomers prepared according to Example IV having the structures: | 0 | 0 | 25 |

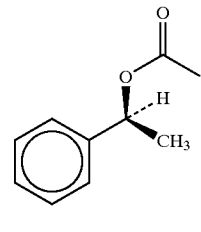

and

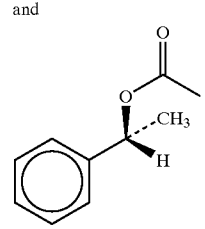

having an optical rotation of 73.06°, [α = +73.06°] with an enantiomeric excess percent of about 81.1, [εε % = 81.1 ± 0.5].

The mixture of styralyl alcohol stereoisomers prepared according to Example I imparts to this Chypre formulation hyacinth, gardenia undertones with strawberry topnotes. Accordingly, the aroma of the Chypre formulation of Example V(A) is described as: "a Chypre aroma with hyacinth and gardenia undertones and strawberry topnotes."

The mixture of styralyl acetate stereoisomers of Example III imparts to this Chypre formulation fresh strawberry; green, dried fruit undertones with green, strawberry topnotes. Accordingly, the aroma of the Chypre formulation of Example V(B) is described as: "a Chypre aroma with strawberry, green and dried fruit undertones and green, strawberry topnotes."

The mixture of styralyl acetate stereoisomers of Example IV imparts to the Chypre formulation of Example V(C) fruity, floral, mimosa, jasmine and gardenia undertones with fruity, strawberry topnotes. Accordingly, the aroma of the Chypre formulation of Example V(C) is described as: "a Chypre aroma with fruity, floral, mimosa, jasmine and gardenia undertones and strawberry, fruity topnotes."

EXAMPLE VI

PREPARATION OF A COSMETIC POWDER COMPOSITION

Cosmetic powder compositions are prepared by mixing in a ball mill 100 grams of talcum powder with 0.25 grams of each of the substances set forth in Table II below. Each of the cosmetic powder compositions has an excellent aroma as described in Table II below.

TABLE II

| Substance | Aroma Description |
|---|---|
| The mixture of stereoisomers having the structures:<br><br>[structure: phenyl-CH(OH)-CH₃ with H wedge, OH]<br><br>and<br><br>[structure: phenyl-CH(OH)-CH₃ with opposite stereochemistry]<br><br>prepared according to Example I, having an optical rotation of −38.6°, [α = −38.6°] with an enantiomeric excess percent of about 87.5, [εε % = 87.5 ± 0.5]. | A hyacinth, gardenia aroma with strawberry topnotes. |
| The mixture of stereoisomers having the structures:<br><br>[structure: phenyl-CH(OAc)-CH₃ acetate]<br><br>and<br><br>[structure: phenyl-CH(OAc)-CH₃ acetate, opposite stereochemistry]<br><br>prepared according to Example III, having an optical rotation of −102.7°, [α = −102.7°] with an enantiomeric excess percent of about 78.31, [εε % = 78.31 ± 0.5]. | A strawberry, green, dried fruit aroma with green, strawberry topnotes. |
| The mixture of stereoisomers having the structures:<br><br>[structure: phenyl-CH(OAc)-CH₃ acetate]<br><br>and<br><br>[structure: phenyl-CH(OAc)-CH₃ acetate]<br><br>having an optical rotation of +73.06°, [α = +73.06°] with an enantiomeric excess percent of about 81.1, [εε % = 81.1 ± 0.5] prepared according to Example IV. | A fruity, floral, jasmine, mimosa, gardenia aroma with fruity and strawberry topnotes. |
| The perfume composition of Example V(A). | A Chypre aroma with hyacinth and gardenia undertones and strawberry topnotes. |
| The perfume composition of Example V(B). | A Chypre aroma with strawberry, green and dried fruit undertones and green, strawberry topnotes. |
| The perfume composition of Example V(C). | A Chypre aroma with fruity, floral, mimosa, jasmine and gardenia undertones and strawberry, fruity topnotes. |

EXAMPLE VII

PERFUMED LIQUID DETERGENT

Concentrated liquid detergents (lysine salt of n-dodecylbenzene sulfonic acid as more specifically described in U.S. Letters Patent No. 3,948,818 issued on Apr. 6, 1976, incorporated by reference herein) with aroma nuances as set forth in Table II of Example VI are prepared by adding 0.10%, 0.15%, 0.20%, 0.25%, 0.30% and 0.35% of the substance set forth in Table II of Example VI. They are prepared by adding and homogeneously mixing the appropriate quantity of substances set forth in Table II of Example VI in the liquid detergent. The detergents all possess excellent aromas as set forth in Table II of Example VI, the intensity increasing with greater concentrations of substance as set forth in Table II of Example VI.

EXAMPLE VIII

PREPARATION OF A COLOGNES AND HANDKERCHIEF PERFUMES

Compositions as set forth in Table II of Example VI are incorporated into colognes at concentrations of 2.0%, 2.5%, 3.0%, 3.5%, 4.0% and 5.0% in 80%, 85%, 90% and 95% aqueous food grade ethanol solutions; and into handkerchief perfumes at concentrations of 15%, 20%, 25% and 30% (in 80%, 85%, 90% and 95% aqueous food grade ethanol solution). Distinctive and definite fragrances as set forth in Table II of Example VI are imparted to the colognes and to the handkerchief perfumes at all levels indicated.

EXAMPLE IX

PREPARATION OF A SOAP COMPOSITION

100 Grams of soap chips (per sample) (IVORY ®, produced by the Procter & Gamble Company of Cincinnati, Ohio) are each mixed with 1 gram samples of substances as set forth in Table II of Example VI until homogenous compositions are obtained. In each of the cases, the homogeneous compositions are heated under 8 atmospheres pressure at 180° C. for a period of 3 hours and the resulting liquids are placed into soap molds. The resulting soap cakes, on cooling, manifest aromas as set forth in Table II of Example VI.

EXAMPLE X

PREPARATION OF SOLID DETERGENT COMPOSITIONS

Detergents are prepared using the following ingredients according to Example I of Canadian Patent No. 1,007,948 (incorporated by reference herein):

| Ingredients | Parts by Weight |
| --- | --- |
| NEODOL ® 45-11 (a $C_{14}$–$C_{15}$ alcohol ethoxylated with 11 moles of ethylene oxide) | 12 |
| Sodium carbonate | 55 |
| Sodium citrate | 20 |
| Sodium sulfate, water brighteners | q.s. |

The detergent is a phosphate-free detergent. Samples of 100 grams each of this detergent are admixed with 0.10, 0.15, 0.20 and 0.25 grams of each of the substances as set forth in Table II of Example VI. Each of the detergent samples has an excellent aroma as indicated in Table II of Example VI.

EXAMPLE XI

Utilizing the procedure of Example I at column 15 of U.S. Pat. No. 3,632,396 (the disclosure of which is incorporated by reference herein), a non-woven cloth substrate useful as drier-added fabric softening articles of manufacture are prepared wherein the substrate, substrate coating, outer coating and the perfuming material are as follows:

(1) a water "dissolvable" paper ("Dissolve Paper");
(2) ADOGEN® 448 (melting point about 140° F.) as the substrate coating; and
(3) an outer coating having the following formulation (melting point about 150° F.):
   57% $C_{20}$–$C_{22}$ HAPS;
   22% isopropyl alcohol;
   20% antistatic agent; and
   1% of one of the perfume materials as set forth in Table II of Example VI.

Fabric softening compositions, prepared according to Example I at column 15 of U.S. Pat. No. 3,632,396 having aroma characteristics as set forth in Table II of Example VI, consist of a substrate coating having a weight of about 3 grams per 100. square inches of substrate; a first coating on the substrate coating consisting of about 1.85 grams per 100 square inches of substrate; and an outer coating coated on the first coating consisting of about 1.4 grams per 100 square inches of substrate. One of the substances of Table II of Example VI is admixed in each case with the outer coating mixture, thereby providing a total aromatized outer coating weight ratio to substrate of about 0.5:1 by weight of the substrate. The aroma characteristics are imparted in a pleasant manner to the headspace in a drier on operation thereof in each case, using. the said drier-added fabric softener, non-woven fabrics, and these aroma characteristics are described in Table II of Example VI.

EXAMPLE XII

HAIR SPRAY FORMULATIONS

The following hair spray formulation is prepared by first dissolving PVP/VA E-735 copolymer manufactured by the GAF Corporation of 140 West 51st Street, New York, N.Y. in 91.62 grams of 95% food grade ethanol. 8.0 Grams of the polymer is dissolved in the alcohol. The following ingredients are added to the PVP/NA alcoholic solution:

| Ingredients | Weight Percent |
| --- | --- |
| Dioctyl sebacate | 0.05 |
| Benzyl alcohol | 0.10 |
| Dow Corning 473 fluid prepared by the Dow Corning | 0.10 |
| TWEEN ® 20 surfactant (prepared by ICI America Corporation) | 0.03 |
| One of the perfumery substances as set forth in Table II of Example VI. | 0.10 |

The perfuming substances as set forth in Table II of Example VI add aroma characteristics as set forth in Table II of Example VI, which are rather intense and aesthetically pleasing to the users of the soft-feel, good-hold pump hair sprays.

EXAMPLE XIII

CONDITIONING SHAMPOOS

Monamid CMS (prepared by the Mona Industries Company) (3.0 weight percent) is melted with 2.0 weight percent coconut fatty acid (prepared by the Procter & Gamble Company of Cincinnati, Ohio); 1.0 weight percent ethylene glycol distearate (prepared by the Armak Corporation); and triethanolamine (a product of the Union Carbide Corporation) (1.4 weight percent). The resulting melt is admixed with Stepanol WAT produced by the Stepan Chemical Company (35.0 weight percent). The resulting mixture is heated to 60° C. and mixed until a clear solution is obtained (at 60° C.).

GAFQUAT® 755N polymer (manufactured by GAF Corporation of 140 West 51st Street, New York, N.Y.) (5.0 weight percent) is admixed with 0.1 weight percent sodium sulfite and 1.4 weight percent polyethylene glycol 6000 distearate produced by the Armak Corporation.

The resulting material is then mixed and cooled to 45° C., and 0.3 weight percent of perfuming substance as set forth in Table II of Example VI is added to the mixture. The resulting mixture is cooled to 40° C., and blending is carried out for an additional 1 hour in each case. At the end of this blending period, the resulting material has a pleasant fragrance as indicated in Table II of Example VI.

EXAMPLE XIV

The following three tapioca pudding flavoring formulations are prepared:

| | Parts by Weight | | |
| --- | --- | --- | --- |
| Ingredients | XIV(A) | XIV(B) | XIV(C) |
| 2-Methyl-2-pentenoic acid | 5 | 5 | 5 |
| 2-Methyl-3-pentenoic acid | 8 | 8 | 8 |
| Ethyl ester of 2-methyl-3-pentenoic acid | 4 | 4 | 4 |
| n-Hexyl ester of 2-methyl-4-pentenoic acid | 6 | 6 | 6 |

-continued

| Ingredients | Parts by Weight | | |
|---|---|---|---|
| | XIV(A) | XIV(B) | XIV(C) |
| The mixture of stereoisomers having the structures: | 2.5 | 0 | 0 |

[Structure: phenyl-CH(OH)(CH₃) with H wedge]

and

[Structure: phenyl-CH(OH)(CH₃) with H wedge, opposite stereochemistry]

prepared according to Example I, having an optical rotation −38.6°, [α = −38.6°] with an enantiomeric excess percent of about 87.5, [εε % = 87.5 ± 0.5].

| The mixture of stereoisomers having the structures: | 0 | 2.5 | 0 |

[Structure: phenyl-CH(OC(O)CH₃)(CH₃) with H]

and

[Structure: phenyl acetate stereoisomer]

prepared according to Example III, having an optical rotation of −102.7°, [α = −102.7°] with an enantiomeric excess percent of about 78.31, [εε = 78.31 ± 0.5].

| The mixture of stereoisomers prepared according to Example IV having the structures: | 0 | 0 | 2.5 |

[Structure: phenyl acetate stereoisomer]

and

-continued

| Ingredients | Parts by Weight | | |
|---|---|---|---|
| | XIV(A) | XIV(B) | XIV(C) |

[Structure: phenyl-CH(OC(O)CH₃)(CH₃) with H]

having an optical rotation of +73.06°, [α = 73.06°] with an enantiomeric excess percent of about 81.1, [εε % = 81.1 ± 0.5].

At the rate of 11 ppm, each of the above strawberry formulations are added to separate portions of tapioca pudding formulations, and the tapioca pudding formulations are crafted into tapioca pudding portions.

The tapioca pudding portion of Example XIV(A) has an excellent strawberry taste with fragrant strawberry jam aromas.

The tapioca pudding portion of Example XIV(B) has an excellent green, fresh strawberry taste with green, avocado and strawberry jam nuances.

The tapioca pudding portion of Example XIV(C) has an excellent strawberry jam taste with apricot and apple flavor nuances.

What is claimed is:

1. A process for augmenting, enhancing or imparting a flavor in or to a foodstuff, chewing gum or beverage comprising the step of intimately admixing with a foodstuff base, a beverage base or a chewing gum base an aroma and taste augmenting, imparting or enhancing quantity and concentration of a mixture of styralyl acetate optical isomers, said mixture having an optical rotation of +73.06° at 20° C. with an enantiomeric excess of about 81.1, said mixture having a chiral GC spectrum of FIG. 3A, said mixture being produced according to the process comprising the steps of:

(a) carrying out a fermentation of acetophenone in the presence of a culture of Kluyveromyces polysporus ATCC 22028 to produce a mixture of styralyl alcohol optical isomers having an optical rotation of −38.6° at 20° C. with an enantiomeric excess of about 87.5; and (b) admixing acetic acid with the resulting mixture of styralyl alcohol optical isomers in the presence of an ester-forming enzyme.

2. The process of claim 11 wherein the flavor is a strawberry flavor.

* * * * *